United States Patent
Makita et al.

(10) Patent No.: US 9,793,772 B2
(45) Date of Patent: Oct. 17, 2017

(54) STATOR FOR ROTATING ELECTRIC MACHINE

(71) Applicants: DENSO CORPORATION, Kariya, Aichi-pref. (JP); ASMO CO., LTD., Kosai, Shizuoka-pref. (JP)

(72) Inventors: Shinji Makita, Kakamigahara (JP); Yasuhide Ito, Toyokawa (JP); Tomohiro Aoyama, Toyohashi (JP)

(73) Assignees: DENSO CORPORATION, Kariya (JP); ASMO CO., LTD., Kosai (JP)

( * ) Notice: Subject to any disclaimer, the term of this patent is extended or adjusted under 35 U.S.C. 154(b) by 682 days.

(21) Appl. No.: 13/948,654

(22) Filed: Jul. 23, 2013

(65) Prior Publication Data

US 2014/0084736 A1 Mar. 27, 2014

(30) Foreign Application Priority Data

Sep. 25, 2012 (JP) .................................. 2012-210951

(51) Int. Cl.
- *H02K 3/12* (2006.01)
- *H02K 21/16* (2006.01)
- *H02K 3/28* (2006.01)

(52) U.S. Cl.
CPC .................. *H02K 3/12* (2013.01); *H02K 3/28* (2013.01); *H02K 21/16* (2013.01); *H02K 2213/03* (2013.01)

(58) Field of Classification Search
CPC H02K 3/12; H02K 3/28; H02K 21/16; H02K 2213/03

(Continued)

(56) References Cited

U.S. PATENT DOCUMENTS

| 5,205,721 A | 4/1993 | Isaacson |
| 6,583,531 B1 | 6/2003 | Asano et al. |

(Continued)

FOREIGN PATENT DOCUMENTS

| JP | 9-191588 | 7/1997 |
| JP | 2000-333423 | 11/2000 |

(Continued)

OTHER PUBLICATIONS

State Intellectual Property Office of People's Republic of China, "The First Office Action," (5 pages) issued in connection with Chinese Patent Application No. 201310446734.8, dated Jul. 30, 2015, with its English language Translation (7 pages).

(Continued)

*Primary Examiner* — John K Kim
(74) *Attorney, Agent, or Firm* — Nixon & Vanderhye P.C.

(57) ABSTRACT

A stator for a rotating electric machine includes an annular stator core and a plurality of winding groups mounted on teeth of the stator core. Each of the winding groups is either a short-pitch winding group which consists of windings wound at a pitch shorter than 180° in electrical angle or a full-pitch winding group which consists of windings wound at a pitch equal to 180° in electrical angle. The winding groups include at least one short-pitch winding group pair which consists of two short-pitch winding groups that respectively belong to two different phases and are circumferentially adjacent to each other. The two short-pitch winding groups are arranged so as not to overlap each other in a radial direction of the stator core. There are no other winding groups interposed between the two short-pitch winding groups in the circumferential direction of the stator core.

14 Claims, 19 Drawing Sheets

(58) Field of Classification Search
USPC ................................ 310/179, 180, 198, 216
IPC ....................................................... H02K 3/12
See application file for complete search history.

(56) References Cited

U.S. PATENT DOCUMENTS

| | | | | |
|---|---|---|---|---|
| 6,787,958 | B1* | 9/2004 | Walter | H02K 1/246 |
| | | | | 310/162 |
| 6,864,667 | B2* | 3/2005 | Buening | H02P 9/02 |
| | | | | 310/179 |
| 2001/0019234 | A1 | 9/2001 | Murakami et al. | |
| 2002/0093266 | A1* | 7/2002 | Buening | H02P 9/02 |
| | | | | 310/198 |
| 2006/0279161 | A1* | 12/2006 | Hitomi | H02K 15/024 |
| | | | | 310/216.004 |
| 2014/0084736 | A1* | 3/2014 | Makita | H02K 21/16 |
| | | | | 310/198 |

FOREIGN PATENT DOCUMENTS

| | | |
|---|---|---|
| JP | 2001-204161 | 7/2001 |
| JP | 3707606 | 8/2005 |

OTHER PUBLICATIONS

Office Action (3 pgs.) dated Nov. 17, 2016 issued in corresponding Japanese Application No. 2012-210951 with an at least partial English-language translation (4 pgs.).

* cited by examiner

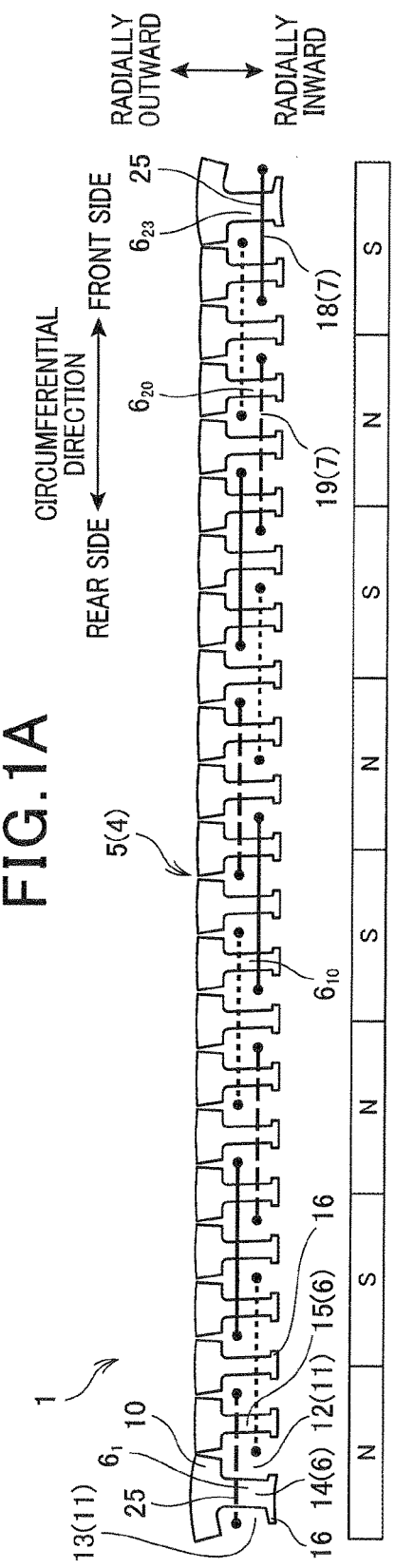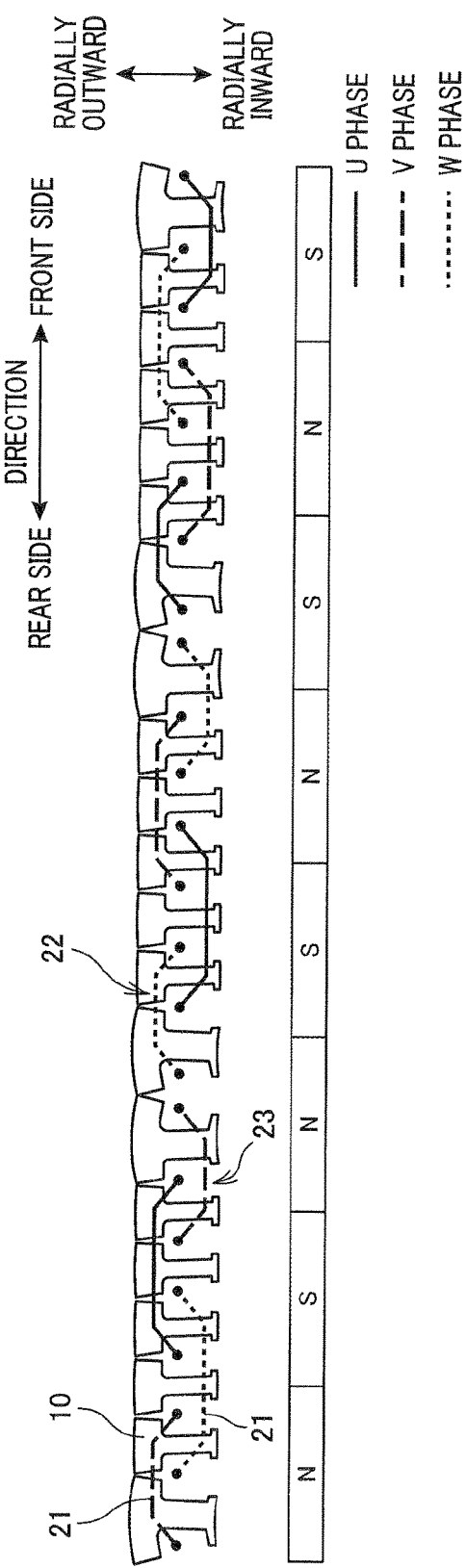

— U PHASE
--- V PHASE
······ W PHASE

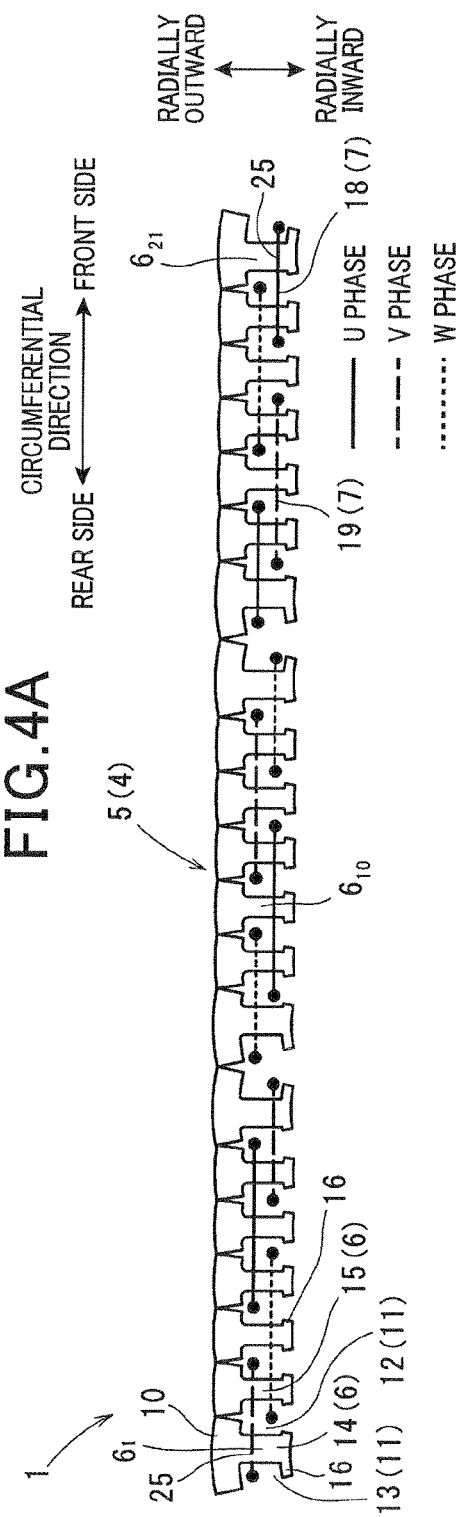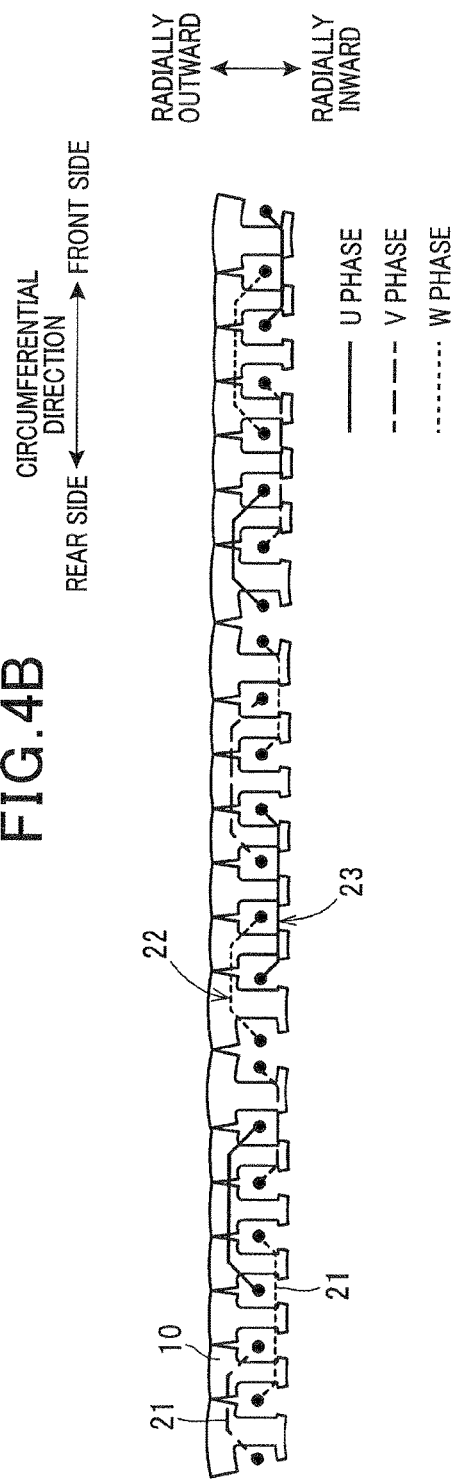

— U PHASE
---- V PHASE
······· W PHASE

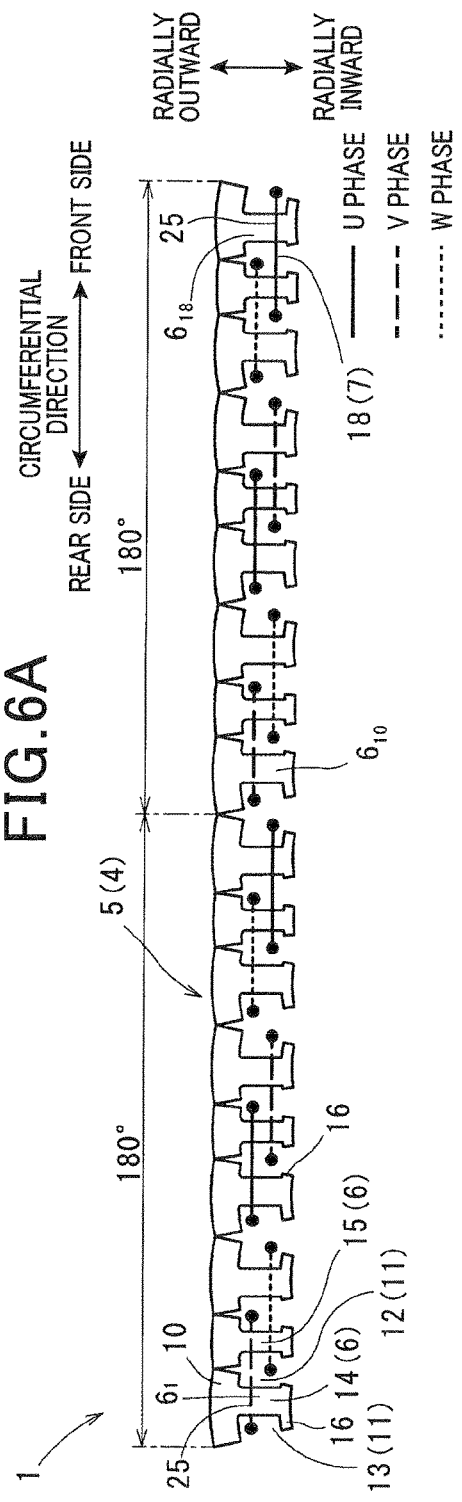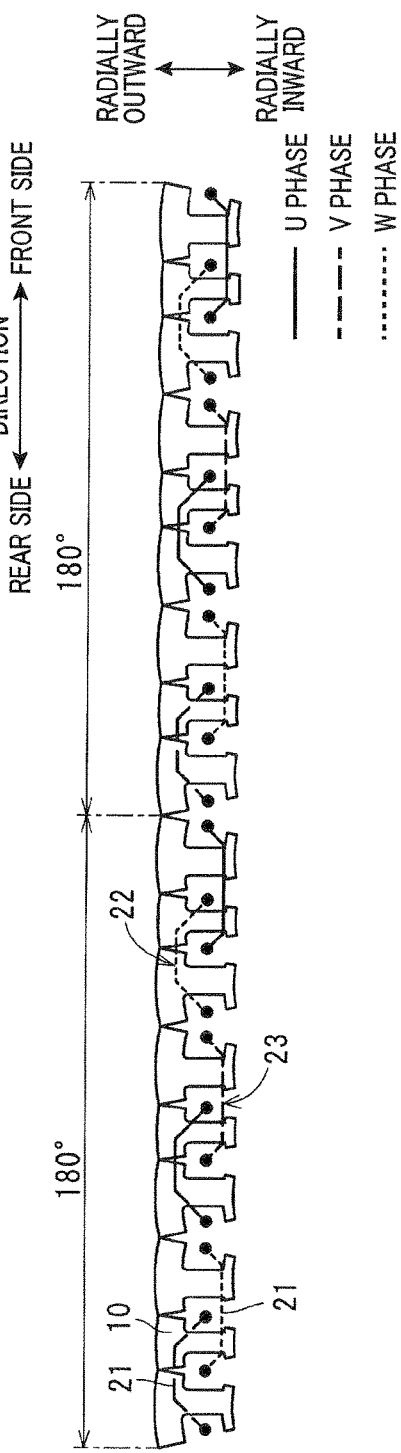

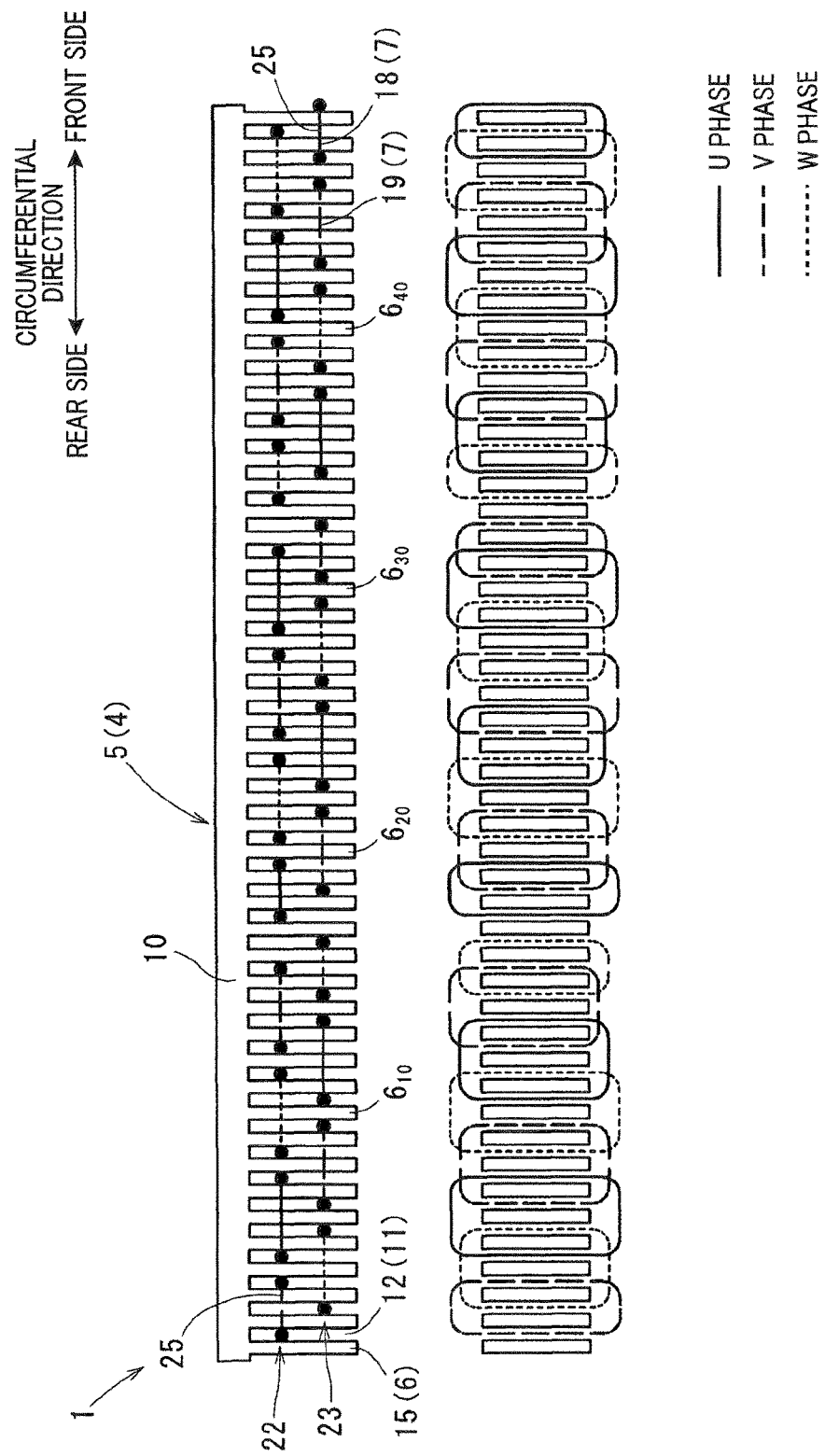

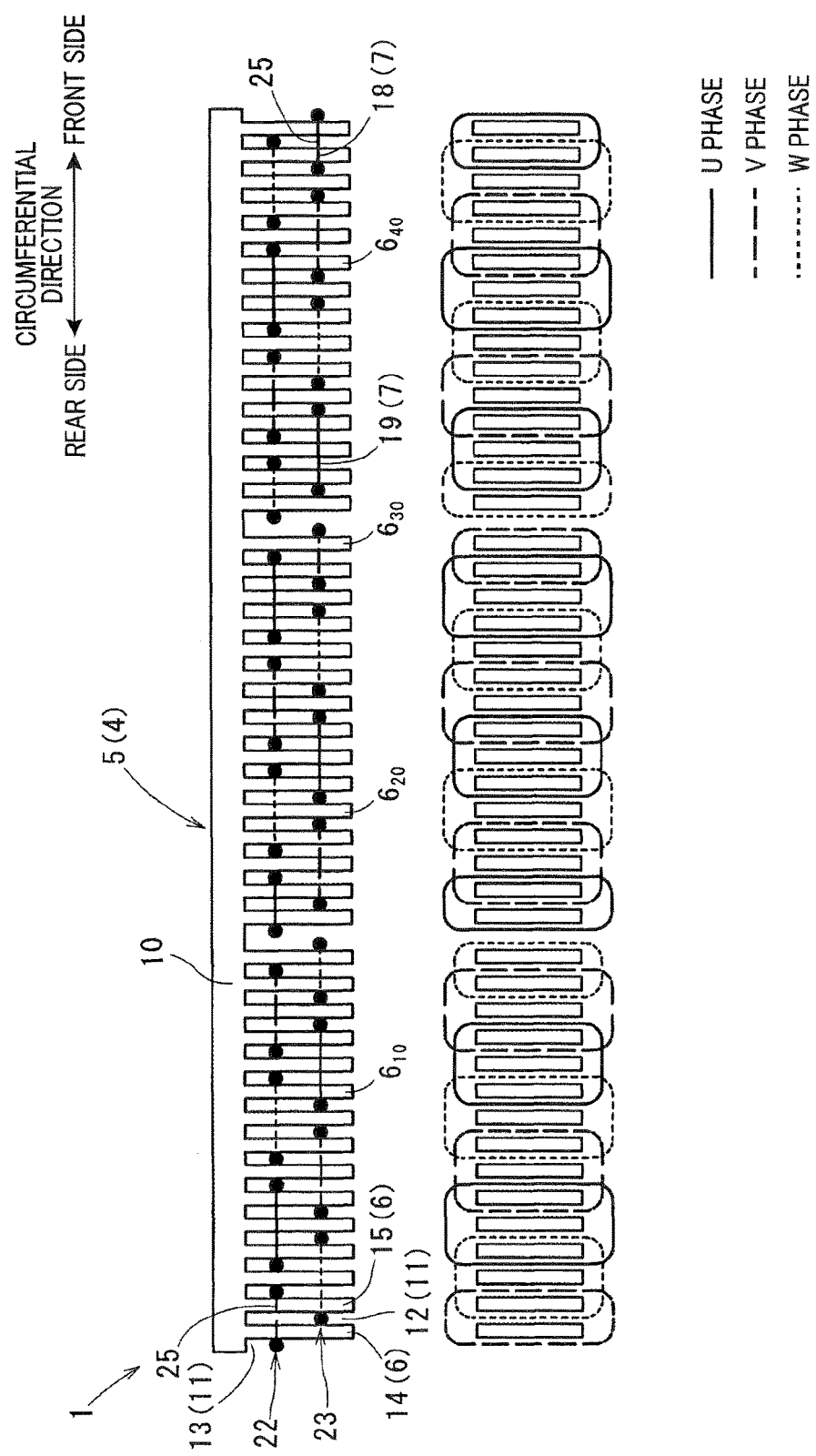

STATOR FOR ROTATING ELECTRIC MACHINE

CROSS-REFERENCE TO RELATED APPLICATION

This application is based on and claims priority from Japanese Patent Application No. 2012-210951, filed on Sep. 25, 2012, the content of which is hereby incorporated by reference in its entirety into this application.

BACKGROUND

1 Technical Field

The present invention relates generally to stators for rotating electric machines that are used in, for example, motor vehicles as electric motors and electric generators, and more particularly to winding structures of the stators.

2 Description of Related Art

There is known, for example from Japanese Patent No. 3707606, a method of manufacturing a stator for a rotating electric machine.

Specifically, according to the method, as shown in FIG. 19, the stator is manufactured by: (1) mounting a plurality of winding groups 103, each of which belongs to one of U, V and W phases, onto teeth 102 formed in a flat band-shaped stator core 101; (2) bending the flat band-shaped stator core 101 into an annular shape so as to make each of the teeth 6 extend radially inward; and (3) joining opposite ends of the bent stator core 101 together.

However, with the above method, it is necessary to divide one of the winding groups 103 into two segments 104 at the opposite ends (i.e., the front and rear ends in FIG. 19) of the flat band-shaped stator core 101. Consequently, after bending the flat band-shaped stator core 101 into the annular shape, it is further necessary to join the two segments 104 to restore the divided winding group 103. As a result, the manufacturing process of the stator is complicated, thereby lowering the productivity of the stator.

In addition, in the example illustrated in FIG. 19, the number of the teeth 102 formed in the stator core 101 is equal to 48; the number of phases is equal to 3; the number of poles (i.e., the number of magnetic poles formed in a rotor of the rotating electric machine) is equal to 16. Each of the winding groups 103 is concentratedly wound at full pitch on the teeth 102 of the stator core 101. In other words, each of the winding groups 103 is a full-pitch concentrated winding group. However, even if the winding groups 103 were distributedly wound at full pitch on the teeth 102 of the stator core 101, the manufacturing process of the stator would still be complicated by the necessity of joining the two segments 104 of the divided winding group 103.

SUMMARY

According to an exemplary embodiment, a stator for a rotating electric machine is provided which includes an annular stator core and a plurality of winding groups. The stator core has a plurality of teeth and a plurality of slots formed therein. The teeth are spaced from one another in a circumferential direction of the stator core. Each of the slots is formed between one circumferentially-adjacent pair of the teeth. The winding groups are mounted on the teeth of the stator core. Each of the winding groups belongs to one of a plurality of phases. Further, each of the winding groups is either a short-pitch winding group which consists of windings wound at a pitch shorter than 180° in electrical angle or a full-pitch winding group which consists of windings wound at a pitch equal to 180° in electrical angle. The winding groups include at least one short-pitch winding group pair which consists of two short-pitch winding groups that respectively belong to two different phases and are circumferentially adjacent to each other. The two short-pitch winding groups are arranged so as not to overlap each other in a radial direction of the stator core. There are no other winding groups interposed between the two short-pitch winding groups in the circumferential direction of the stator core.

With the above configuration, in manufacturing the stator with a flat band-shaped stator core as described previously, it is possible to arrange the two short-pitch winding groups forming the short-pitch winding group pair respectively at opposite ends of the flat band-shaped stator core without dividing any of the winding groups into two segments. Consequently, it becomes possible to eliminate the step of joining the two segments 104 to restore the divided winding group 103 in the conventional method described in the previous section (see also FIG. 19). As a result, the manufacturing process of the stator can be simplified, thereby improving the productivity of the stator.

In one further implementation, the following equations are satisfied: M1=2; and M2=N/2−2, where M1 is the number of the short-pitch winding groups per phase, M2 is the number of the full-pitch winding groups per phase, and N is an even number not less than 4 and represents the number of poles of the rotating electric machine. All the short-pitch winding groups are arranged in pairs to form a plurality of short-pitch winding group pairs. Each of the short-pitch winding group pairs consists of two short-pitch winding groups that respectively belong to two different phases and are circumferentially adjacent to each other. For each of the short-pitch winding group pairs, the two short-pitch winding groups are arranged so as not to overlap each other in a radial direction of the stator core, and there are no other winding groups interposed between the two short-pitch winding groups in the circumferential direction of the stator core.

Further, in the above further implementation, the slots formed in the stator core may include a plurality of two-phase slots in each of which are arranged both the short-pitch winding groups of one of the short-pitch winding group pairs. In this case, it is preferable that: S=3×q×N−3×(2×q−1), where q is the number of the slots per pole per phase and S represents both the total number of the slots and the total number of the teeth formed in the stator core. It is further preferable that the circumferential width of the two-phase slots is substantially 2×q times the circumferential width of the other slots.

In another further implementation, the following equations are satisfied: M1=4, and M2=N/2−4, where M1 is the number of the short-pitch winding groups per phase, M2 is the number of the full-pitch winding groups per phase, and N is an even number not less than 8 and represents the number of poles of the rotating electric machine. All the short-pitch winding groups are arranged in pairs to form a plurality of short-pitch winding group pairs. Each of the short-pitch winding group pairs consists of two short-pitch winding groups that respectively belong to two different phases and are circumferentially adjacent to each other. For each of the short-pitch winding group pairs, the two short-pitch winding groups are arranged so as not to overlap each other in a radial direction of the stator core, and there are no other winding groups interposed between the two short-pitch winding groups in the circumferential direction of the stator core. The phases of all the winding groups are arranged in a pattern which is repeated for every 180° in mechanical angle.

Further, in the above further implementation, the slots formed in the stator core may include a plurality of two-phase slots in each of which are arranged both the short-pitch winding groups of one of the short-pitch winding group pairs. In this case, it is preferable that: $S=3 \times q \times N - 6 \times (2 \times q - 1)$, where q is the number of the slots per pole per phase and S represents both the total number of the slots and the total number of the teeth formed in the stator core. It is preferable that the circumferential width of the two-phase slots is substantially $2 \times q$ times the circumferential width of the other slots.

Moreover, in the above further implementations, it is preferable that among all the teeth formed in the stator core, the circumferential width of those teeth which form the two-phase slots is substantially $(q+0.5)$ times the circumferential width of the other teeth.

Further, each of the teeth of the stator core may have a pair of protrusions that are formed at a distal end of the tooth so as to protrude in the circumferential direction of the stator core respectively toward those two of the slots of the stator core which adjoin the tooth. In this case, it is preferable that among all the protrusions of the teeth, those protrusions which protrude toward the respective two-phase slots have a greater circumferential width than the other protrusions.

In yet another further implementation, the winding groups include only one short-pitch winding group pair. The slots formed in the stator core include a two-phase slot in which are arranged both the short-pitch winding groups forming the short-pitch winding group pair. The circumferential width of the two-phase slot is substantially $2 \times q$ times the circumferential width of the other slots.

In this further implementation, it is preferable that among all the teeth formed in the stator core, the circumferential width of those two teeth which form the two-phase slot therebetween is substantially $(q+0.5)$ times the circumferential width of the other teeth.

Further, each of the teeth of the stator core may have a pair of protrusions that are formed at a distal end of the tooth so as to protrude in the circumferential direction of the stator core respectively toward those two of the slots of the stator core which adjoin the tooth. In this case, it is preferable that among all the protrusions of the teeth, those two protrusions which protrude toward the two-phase slot have a greater circumferential width than the other protrusions.

In all of the above further implementations, the winding groups may be classified into outward-located winding groups and inward-located winding groups. For each of the outward-located winding groups, end portions of the windings of the group, which protrude outside of the slots of the stator core, are located radially outward of a radial center position of the slots. For each of the inward-located winding groups, end portions of the windings of the group, which protrude outside of the slots of the stator core, are located radially inward of the radial center position of the slots. In this case, it is preferable that: all the outward-located winding groups are spaced in the circumferential direction of the stator core so as not to intersect and radially overlap each other; and all the inward-located winding groups are spaced in the circumferential direction of the stator core so as not to intersect and radially overlap each other.

Moreover, it is also preferable that: all the circumferential distances between circumferentially-facing pairs of the protrusions of the teeth are equal to each other.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 1A is a schematic view illustrating the arrangement of a plurality of winding groups on a flat band-shaped stator core according to a first embodiment;

FIG. 1B is a schematic view illustrating the location of end portions of the winding groups which protrude outside of slots of the flat band-shaped stator core of FIG. 1A;

FIG. 4A is a schematic view illustrating the arrangement of a plurality of winding groups on a flat band-shaped stator core according to a third embodiment;

FIG. 4B is a schematic view illustrating the location of end portions of the winding groups which protrude outside of slots of the flat band-shaped stator core of FIG. 4A;

FIG. 6A is a schematic view illustrating the arrangement of a plurality of winding groups on a flat band-shaped stator core according to a fourth embodiment;

FIG. 6B is a schematic view illustrating the location of end portions of the winding groups which protrude outside of slots of the flat band-shaped stator core of FIG. 6A;

FIG. 9 is a schematic view illustrating the arrangement of a plurality of winding groups on a flat band-shaped stator core according to a fifth embodiment;

FIG. 10 is a schematic view illustrating the arrangement of a plurality of winding groups on a flat band-shaped stator core according to a sixth embodiment;

DESCRIPTION OF EMBODIMENTS

Figure 2:
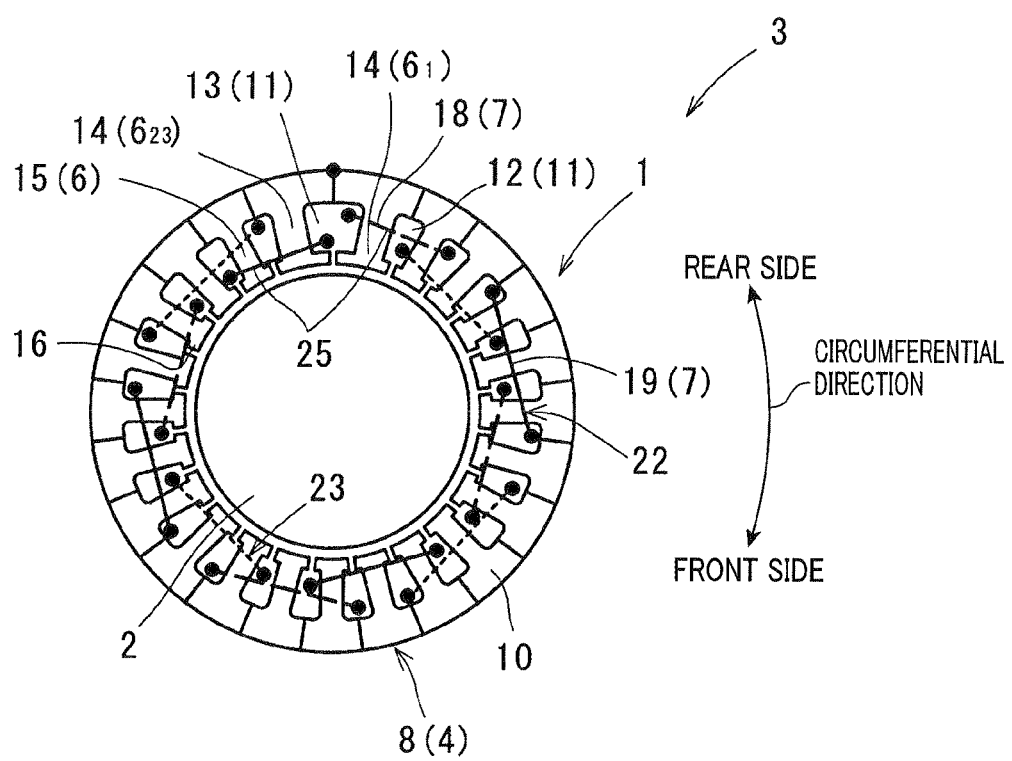
FIG. 2 is a schematic view illustrating the arrangement of the winding groups on an annular stator core which is obtained by bending the flat band-shaped stator core of FIG. 1A.

Exemplary embodiments will be described hereinafter with reference to FIGS. 1-18. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIGS. 1A-1B and 2 together show the configuration of a stator 1 according to a first embodiment.

In the present embodiment, the stator 1 is used in an inner rotor-type rotating electric machine 3. Specifically, the rotating electric machine 3, which may be a three-phase synchronous or induction machine, has a rotor 2 disposed radially inside the stator 1 as shown in FIG. 2. Further, though not shown in FIG. 2, the rotor 2 has a plurality of magnetic poles formed on the radially outer periphery thereof. The polarities of the magnetic poles alternate between north and south in the circumferential direction of the rotor 2 (or in the circumferential direction of the stator 1) as shown in FIGS. 1A and 1B.

In the present embodiment, the stator 1 is made by: (1) mounting a plurality of winding groups 7, each of which belongs to one of U, V and W phases, onto teeth 6 formed in a flat band-shaped stator core 5; (2) bending the flat band-shaped stator core 5 into an annular shape so as to make each of the teeth 6 extend radially inward; and (3) joining opposite ends of the bent stator core 5 together. Hereinafter, the stator core of the stator 1 will be generally designated by reference numeral 4; the stator core will also be designated by reference numeral 5 when it is in the flat band shape and by reference numeral 8 when it is in the annular shape.

Moreover, as shown in FIGS. 1A-1B and 2, between each circumferentially-adjacent pair of the teeth 6, there is formed one slot 11 that opens on the radially inner side. In the present embodiment, all the winding groups 7 are concentratedly wound on the teeth 6; the number q of the slots 11 per pole per phase is equal to 1.

It should be noted that: the longitudinal direction of the flat band-shaped stator core 5 (i.e., the horizontal direction in FIGS. 1A-1B) corresponds to the circumferential direction of the annular stator core 8 (see FIG. 2); and opposite sides in the circumferential direction will be respectively referred to as front and rear sides hereinafter only for the sake of convenience of explanation.

Moreover, also for the sake of convenience of explanation, in all the exemplary embodiments described hereinafter, the teeth 6 of the flat band-shaped stator core 5 are sequentially numbered from the rear side to the front side in the circumferential direction as $6_1, 6_2, \ldots, 6_t$, where t represents the total number of the teeth 6.

In addition, in the drawings, the teeth numbers $6_1$-$6_t$ are shown only for some of the teeth 6 for the sake of simplicity; each U-phase winding group 7 is represented by a bold line; each V-phase winding group 7 is represented by a bold dashed line; each W-phase winding group 7 is represented by a fine dashed line.

In the present embodiment, the stator core 4 also includes a back yoke 10 from which the teeth 6 protrudes radially inward. For each of the slots 11 formed between the teeth 6, the depth direction of the slot 11 corresponds to a radial direction of the stator core 4.

Moreover, in the present embodiment, the slots 11 consist of a plurality of small slots 12 and a large slot 13. In each of the small slots 12, there are received the windings of only one corresponding winding group 7. On the other hand, in the large slot 13, there are received the windings of two corresponding winding groups 7. The circumferential width of the large slot 13 is substantially twice the circumferential width of the small slots 12. That is, the circumferential width of the large slot 13 is substantially 2×q times the circumferential width of the small slots 12, where q is the number of the slots 11 per pole (i.e. per magnetic pole of the rotor 2) per phase.

Furthermore, in the present embodiment, the teeth 6 consist of a pair of specific teeth 14 and normal teeth 15. As shown in FIG. 2, the specific teeth 14 are circumferentially adjacent to each other and form the large slot 13 therebetween. Each circumferential-adjacent pair of the normal teeth 15 forms one of the small slots 12 therebetween. In addition, each circumferential-adjacent pair of one of the specific teeth 14 and one of the normal teeth 15 also forms one of the small slots 12 therebetween. The circumferential width of the specific teeth 14 is substantially 1.5 times the circumferential width of the normal teeth 15. That is, the circumferential width of the specific teeth 14 is substantially (q+0.5) times the circumferential width of the normal teeth 15.

In the present embodiment, each of the teeth 6 has a pair of protrusions 16 formed at its distal end; the protrusions 16 protrude in the circumferential direction respectively toward those two of the slots 11 which adjoin the tooth 6. Among all the protrusions 16 of the teeth 6, the two protrusions 16 which protrude toward the large slot 13 have a greater circumferential width than the other protrusions 16 which protrude toward the respective small slots 12. In addition, all the circumferential distances between circumferentially-facing pairs of the protrusions 16 of the teeth 6 are set to be equal to each other.

In the present embodiment, the winding groups 7 are classified into short-pitch (or fractional-pitch) winding groups 18 and full-pitch winding groups 19. For each of the short-pitch winding groups 18, all the windings of the group are wound at a pitch shorter than 180° in electrical angle. On the other hand, for each of the full-pitch winding groups 19, all the windings of the group are wound at a pitch equal to 180° in electrical angle.

Moreover, the winding groups 7 are also classified into outward-located winding groups 22 and inward-located winding groups 23. For each of the outward-located winding groups 22, end portions 21 of the windings of the group, which protrude outside of the slots 11 of the stator core 4, are located radially outward of the radial center position of the slots 11 (or the radial center position of the teeth 6). In contrast, for each of the inward-located winding groups 23, end portions 21 of the windings of the group, which protrude outside of the slots 11 of the stator core 4, are located radially inward of the radial center position of the slots 11.

Further, for each of the outward-located winding groups 22, the end portions 21 of the windings of the group extend in the vicinity of the back yoke 10 of the stator core 4 without intersecting the end portions 21 of the windings of any other outward-located winding group 22. On the other hand, for each of the inward-located winding groups 23, the end portions 21 of the windings of the group extend in the vicinity of distal end portions of the teeth 6 of the stator core 4 without intersecting the end portions 21 of the windings of any other inward-located winding group 23.

Next, the arrangements of the teeth 6, the slots 11 and the winding groups 7 according to the present embodiment will be described in more detail.

In the present embodiment, as shown in FIGS. 1A-1B, the number N of poles (i.e., the number N of the magnetic poles of the rotor 2) is equal to 8. That is, there are four north (N) poles and four south (S) poles formed on the radially outer periphery of the rotor 2. The total number S of the slots 11 (or of the teeth 6) of the stator core 4 is equal to 23. The total number of the winding groups 7 is equal to 12. That is, there are four U-phase winding groups 7, four V-phase winding groups 7 and four W-phase winding groups 7 wound on the teeth 6 of the stator core 4.

The slots 11 formed in the stator core 4 consist of one large slot 13 and twenty-two small slots 12. Accordingly, the teeth 6 formed in the stator core 4 consist of two specific teeth 14 and twenty-one normal teeth 15.

Further, as shown in FIGS. 1A-1B, in the flat band-shaped stator core 5, the large slot 13 is divided into two halves that are respectively located at the front and rear ends of the flat band-shaped stator core 5. Accordingly, the two specific teeth 14 that together form the large slot 13 are respectively arranged at the front and rear ends of the flat band-shaped stator core 5. In addition, as shown in FIG. 2, the two halves of the large slot 13 are united into one in the annular stator core 8 that is obtained by bending the flat band-shaped stator core 5 into the annular shape and joining the front and rear ends of the bent stator core 5 together.

The twelve winding groups 7 consist of two short-pitch winding groups 18 and ten full-pitch winding groups 19. One of the two short-pitch winding groups 18 belongs to U phase, while the other belongs to V phase. That is, the two short-pitch winding groups 18 belong to different phases.

Of the twelve winding groups 7, the V-phase short-pitch winding group 18 and five full-pitch winding groups 19 are outward-located winding groups 22, while the U-phase short-pitch winding group 18 and the remaining five full-pitch winding groups 19 are inward-located winding groups 23. In the flat band-shaped stator core 5, the six outward-located winding groups 22 are sequentially arranged in the circumferential direction such that: the V-phase short-pitch winding group 18 is located at the rear end; and between each adjacent pair of the outward-located winding groups 22, there is interposed one of the normal teeth 15. Similarly, the six inward-located winding groups 23 are sequentially arranged in the circumferential direction such that: the U-phase short-pitch winding group 18 is located at the front end; and between each adjacent pair of the inward-located winding groups 23, there is interposed one of the normal teeth 15.

More specifically, for the outward-located winding groups 22, the V-phase short-pitch winding group 18 is wound so as to span (or extend across) the teeth $6_1$ and $6_2$. The first U-phase full-pitch winding group 19 is wound so as to span the teeth $6_4$, $6_5$, and $6_6$. The first W-phase full-pitch winding group 19 is wound so as to span the teeth $6_8$, $6_9$, and $6_{10}$. The first V-phase full-pitch winding group 19 is wound so as to span the teeth $6_{12}$, $6_{13}$, and $6_{14}$. The second U-phase full-pitch winding group 19 is wound so as to span the teeth $6_{16}$, $6_{17}$, and $6_{18}$. The second W-phase full-pitch winding group 19 is wound so as to span the teeth $6_{20}$, $6_{21}$, and $6_{23}$.

Accordingly, for the outward-located winding groups 22, there are interposed: the tooth $6_3$ between the V-phase short-pitch winding group 18 and the first U-phase full-pitch winding group 19 which are circumferentially adjacent to each other; the tooth $6_7$ between the first U-phase full-pitch winding group 19 and the first W-phase full-pitch winding group 19 which are circumferentially adjacent to each other; the tooth $6_{11}$ between the first W-phase full-pitch winding group 19 and the first V-phase full-pitch winding group 19 which are circumferentially adjacent to each other; the tooth $6_{15}$ between the first V-phase full-pitch winding group 19 and the second U-phase full-pitch winding group 19 which are circumferentially adjacent to each other; and the tooth $6_{19}$ between the second U-phase full-pitch winding group 19 and the second W-phase full-pitch winding group 19 which are circumferentially adjacent to each other.

On the other hand, for the inward-located winding groups 23, the third W-phase full-pitch winding group 19 is wound to span the teeth $6_2$, $6_3$, and $6_4$. The second V-phase full-pitch winding group 19 is wound to span the teeth $6_6$, $6_7$, and $6_8$. The third U-phase full-pitch winding group 19 is wound to span the teeth $6_{10}$, $6_{11}$, and $6_{12}$. The fourth W-phase full-pitch winding group 19 is wound to span the teeth $6_{14}$, $6_{15}$, and $6_{16}$. The third V-phase full-pitch winding group 19 is wound to span the teeth $6_{18}$, $6_{19}$, and $6_{20}$. The U-phase short-pitch winding group 18 is wound so as to span the teeth $6_{22}$ and $6_{23}$.

Accordingly, for the inward-located winding groups 23, there are interposed: the tooth $6_5$ between the third W-phase full-pitch winding group 19 and the second V-phase full-pitch winding group 19 which are circumferentially adjacent to each other; the tooth $6_9$ between the second V-phase full-pitch winding group 19 and the third U-phase full-pitch winding group 19 which are circumferentially adjacent to each other; the tooth $6_{13}$ between the third U-phase full-pitch winding group 19 and the fourth W-phase full-pitch winding group 19 which are circumferentially adjacent to each other; the tooth $6_{17}$ between the fourth W-phase full-pitch winding group 19 and the third V-phase full-pitch winding group 19 which are circumferentially adjacent to each other; and the tooth $6_{21}$ between the third V-phase full-pitch winding group 19 and the U-phase short-pitch winding group 18 which are circumferentially adjacent to each other.

Consequently, in the present embodiment, all the six outward-located winding groups 22 are circumferentially spaced so as not to radially overlap each other. Similarly, all the six inward-located winding groups 23 are also circumferentially spaced so as not to radially overlap each other. Further, as shown in FIG. 2, in the large slot 13, there are received both a rear part of the V-phase short-pitch winding group 18 that is one of the outward-located winging groups 22 and a front part of the U-phase short-pitch winding group 18 that is one of the inward-located winging groups 23. That is, the large slot 13 is configured as a two-phase slot.

More specifically, in the present embodiment, the large slot 13 is formed between the circumferentially-adjacent pair of the specific teeth 14 (i.e., the teeth $6_1$ and $6_{23}$) that are respectively provided at the front and rear ends of the flat band-shaped stator core 5. In the large slot 13, there is received a short-pitch winding group pair 25 that consists of the two short-pitch winding groups 18. The two short-pitch winding groups 18 respectively belong to two different phases (i.e., U and V phases in the present embodiment) and are circumferentially adjacent to each other. Further, the two short-pitch winding groups 18 are arranged in the large slot 13 so that they do not radially overlap each other (i.e., do not overlap each other in a radial direction of the stator core 4) and have none of the other winding groups 7 circumferentially interposed therebetween.

According to the present embodiment, it is possible to achieve the following advantageous effects.

In the present embodiment, the stator 1 includes the annular stator core 8 (or 4) and the winding groups 7. The annular stator core 8 has both the teeth 6 and the slots 11 formed therein. The teeth 6 are spaced from one another in the circumferential direction of the annular stator core 8. Each of the slots 11 is formed between one circumferentially-adjacent pair of the teeth 6. The winding groups 7 are mounted on the teeth 6 of the stator core 8. Each of the winding groups 7 belongs to one of U, V and W phases. Moreover, the stator 1 is made by: (1) mounting the winding groups 7 onto the teeth 6 formed in the flat band-shaped stator core 5; (2) bending the flat band-shaped stator core 5 into the shape of the annular stator core 8; and (3) joining opposite ends (i.e., the front and rear ends in FIGS. 1A-1B) of the bent stator core 5 to form the annular stator core 8. Furthermore, the winding groups 7 include the short-pitch winding group pair 25 which consists of the two short-pitch winding groups 18 that respectively belong to two different phases (i.e., U and V phases in the present embodiment) and are circumferentially adjacent to each other. The two short-pitch winding groups 18 forming the short-pitch winding group pair 25 are arranged so as not to overlap each other in a radial direction of the annular stator core 8. There are no other winding groups 7 interposed in the circumferential direction of the annular stator core 8 between the two short-pitch winding groups 18 forming the short-pitch winding group pair 25.

Figure 19:
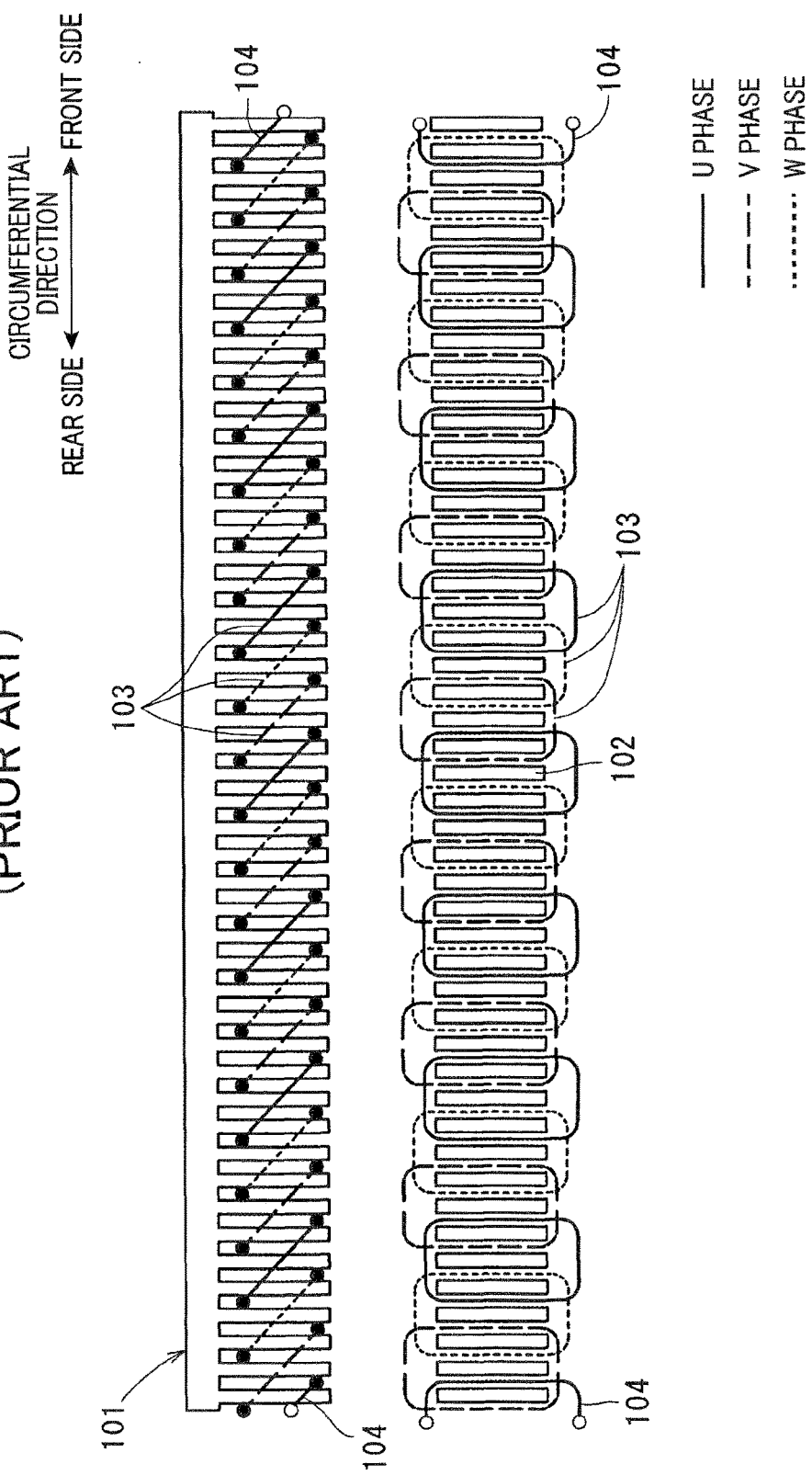
FIG. 19 is a schematic view illustrating the arrangement of a plurality of winding groups on a flat band-shaped stator core according to a prior art.

With the above configuration of the stator 1, it is possible to arrange the two short-pitch winding groups 18 forming the short-pitch winding group pair 25 respectively at the front and rear ends of the flat band-shaped stator core 5 without dividing any of the winding groups 7 into two segments. Consequently, it becomes possible to eliminate the step of joining the two segments 104 to restore the divided winding group 103 in the conventional method described previously (see FIG. 19). As a result, the manufacturing process of the stator 1 can be simplified, thereby improving the productivity of the stator 1.

Moreover, in the present embodiment, the slots 11 of the stator core 8 consist of the small slots 12 and the large slot 13. Each of the small slots 12 is configured as a single-phase slot to receive the windings of only one corresponding winding group 7. On the other hand, the large slot 13 is configured as a two-phase slot to receive the windings of both the short-pitch winding groups 18 forming the short-pitch winding group pair 25. Further, the circumferential width of the large slot 13 is set to be substantially 2×q times the circumferential width of the small slots 12, where q is the number of the slots 11 per pole per phase.

Setting the circumferential width of the large slot 13 as above, it is possible to arrange both the short-pitch winding groups 18 in the large slot 13 so as not to radially overlap each other while surrounding each of all the teeth 6 of the stator core 8 with the winding groups 7. Consequently, it becomes possible to effectively utilize all the magnetic fluxes flowing in the teeth 6 of the stator core 8, thereby increasing the efficiency of the rotating electric machine 3.

Further, in the present embodiment, the teeth 6 of the stator core 8 include the pair of specific teeth 14 that together form the large slot 13. The circumferential width of the specific teeth 14 is set to be substantially (q+0.5) times the circumferential width of the normal teeth 15.

Setting the circumferential width of the specific teeth 14 as above, it is possible to relax magnetic saturation of the specific teeth 14, thereby increasing the winding factor of the rotating electric machine 3.

In the present embodiment, the winding groups 7 are classified into the outward-located winding groups 22 and the inward-located winding groups 23. All the outward-located winding groups 22 are spaced in the circumferential direction of the stator core 8 so as not to intersect and radially overlap each other. All the inward-located winding groups 23 are also spaced in the circumferential direction of the stator core 8 so as not to intersect and radially overlap each other.

With the above configuration, it is possible to suitably arrange the end portions 21 of the windings of the winding groups 7 on both the axial sides of the stator core 8 without causing interference between the end portions 21. Consequently, it is possible to minimize the protruding height of the end portions 21 of the windings of the winding groups 7 from the axial end faces of the stator core 8 while securing high space factors of the windings in the slots 11 of the stator core 8.

In the present embodiment, each of the teeth 6 of the stator core 8 has the pair of protrusions 16 that are formed at the distal end of the tooth 6 so as to protrude in the circumferential direction of the stator core 8 respectively toward those two of the slots 11 of the stator core 8 which adjoin the tooth 6. Further, among all the protrusions 16 of the teeth 6, the circumferential width of the two protrusions 16 which protrude toward the large slot (or two-phase slot) 13 is set to be greater than the circumferential width of the other protrusions 16 which protrude toward the respective small slots (or single-phase slots) 12.

Setting the circumferential width of the two protrusions 16 protruding toward the large slot 13 as above, it is possible to more effectively utilize the magnetic fluxes flowing in the specific teeth 14 of the stator core 8.

Further, in the present embodiment, all the circumferential distances between circumferentially-facing pairs of the protrusions 16 of the teeth 6 are set to be equal to each other.

Setting the circumferential distances as above, it is possible to smooth the circumferential distribution of magnetic flux density in the annular gap between the stator 1 and the rotor 2, thereby suppressing, for example, torque ripple of the rotating electric machine 3.

Second Embodiment

This embodiment illustrates a stator 1 which has a similar configuration to the stator 1 according to the first embodiment; accordingly, only the differences therebetween will be described hereinafter.

Figure 3:
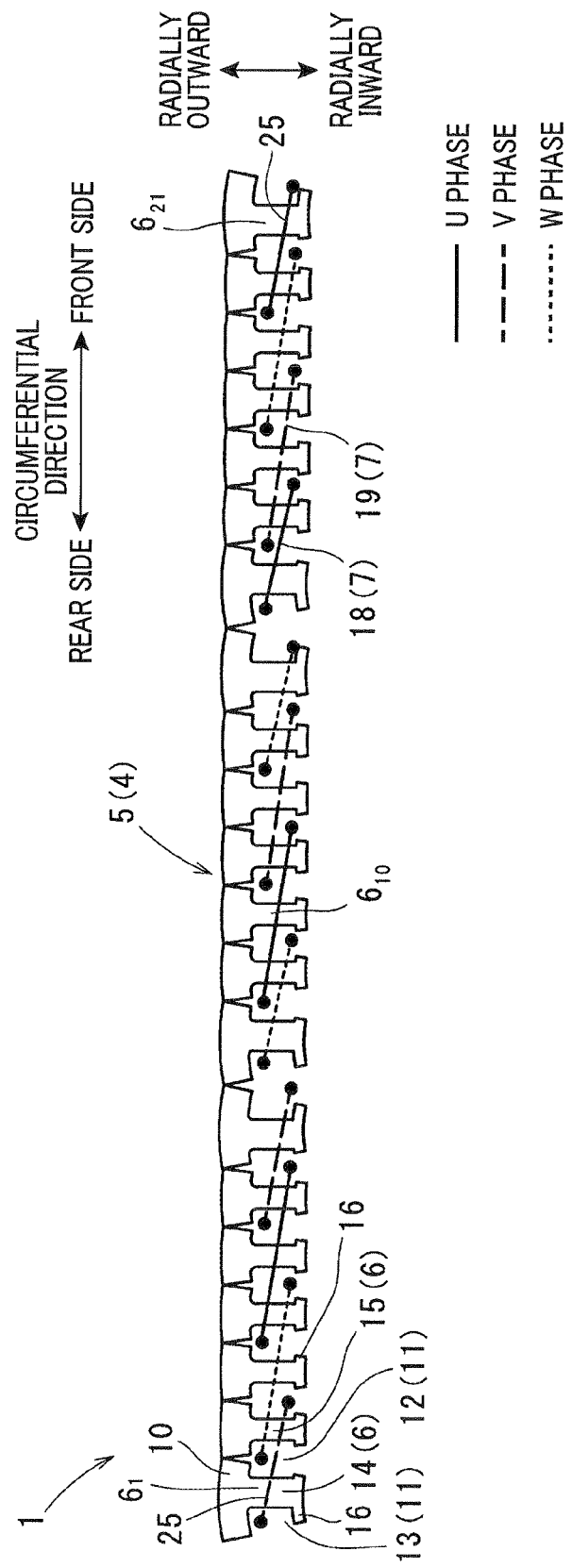
FIG. 3 is a schematic view illustrating the arrangement of a plurality of winding groups on a flat band-shaped stator core according to a second embodiment.

In the present embodiment, as shown in FIG. 3, the total number S of the slots 11 (or of the teeth 6) of the stator core 4 is equal to 21. The total number of the winding groups 7 is equal to 12. That is, there are four U-phase winding groups 7, four V-phase winding groups 7 and four W-phase winding groups 7 wound on the teeth 6 of the stator core 4. In addition, the number N of poles is equal to 8 as in the first embodiment.

Further, in the present embodiment, the slots 11 formed in the stator core 4 consist of three large slots (or two-phase slots) 13 and eighteen small slots (or single-phase slots) 12. The teeth 6 formed in the stator core 4 consist of six specific teeth 14 and fifteen normal teeth 15. More specifically, the teeth $6_1$, $6_7$, $6_8$, $6_{14}$, $6_{15}$ and $6_{21}$ are the specific teeth 14, while all the other teeth $6_2$-$6_6$, $6_9$-$6_{13}$ and $6_{16}$-$6_{20}$ are the normal teeth 15.

The three large slots 13 are arranged in the circumferential direction of the stator core 4 at a pitch equal to 120° in mechanical angle. Between each adjacent pair of the large slots 13, there are arranged six small slots 12.

Further, as shown in FIG. 3, in the flat band-shaped stator core 5, one of the three large slots 13 is divided into two halves that are respectively located at the front and rear ends of the flat band-shaped stator core 5. Accordingly, those two of the specific teeth 14 which together form the divided large slot 13 are respectively arranged at the front and rear ends of the flat band-shaped stator core 5. In addition, though not graphically shown, the two halves of the divided large slot 13 are united into one in the annular stator core 8 that is obtained by bending the flat band-shaped stator core 5 into the annular shape and joining the front and rear ends of the bent stator core 5 together.

In the present embodiment, the winding groups 7 consist of six short-pitch winding groups 18 and six full-pitch winding groups 19, which are equally assigned to the three different phases. That is, to each of U, V and W phases, there are assigned two short-pitch winding groups 18 and two full-pitch winding groups 19.

Accordingly, in the stator 1 according to the present embodiment, the following equations are satisfied:

$$M1=2 \quad \text{(Equation 1)}$$

$$M2=N/2-2 \quad \text{(Equation 2)}$$

$$S=3 \times q \times N - 3 \times (2 \times q - 1) \quad \text{(Equation 3)}$$

where M1 is the number of the short-pitch winding groups 18 per phase, M2 is the number of the full-pitch winding groups 19 per phase, N is an even number not less than 4 and represents the number of poles, S is the total number of the slots 11, and q is the number of the slots 11 per pole per phase.

More particularly, in the present embodiment, with N and q respectively set to 8 and 1, the resultant M1, M2 and S are respectively equal to 2, 2 and 21.

Further, in the present embodiment, as shown in FIG. 3, for each of the winding groups 7, the end portions 21 of the windings of the group 7 extend across the radial center position of the teeth 6 of the stator core 4 so as to be located radially inward of the radial center position on the front side in the circumferential direction of the stator core 4 and radially outward of the radial center position on the rear side in the circumferential direction.

Furthermore, in the present embodiment, a pattern of arranging the winding groups 7 is repeated three times in the circumferential direction of the stator core 4; in the pattern, one short-pitch winding group 18, two full-pitch winding groups 19 and another short-pitch winding group 18 are sequentially arranged from the rear side to the front side in the circumferential direction.

More specifically, the first V-phase short-pitch winding group 18 is wound so as to span the teeth $6_1$ and $6_2$. The first W-phase full-pitch winding group 19 is wound so as to span the teeth $6_2$, $6_3$ and $6_4$. The first U-phase full-pitch winding group 19 is wound so as to span the teeth $6_4$, $6_5$ and $6_6$. The second V-phase short-pitch winding group 18 is wound so as to span the teeth $6_6$ and $6_7$.

Further, the first W-phase short-pitch winding group 18 is wound so as to span the teeth $6_8$ and $6_9$. The second U-phase full-pitch winding group 19 is wound so as to span the teeth $6_9$, $6_{10}$ and $6_{11}$. The first V-phase full-pitch winding group 19 is wound so as to span the teeth $6_{11}$, $6_{12}$ and $6_{13}$. The second W-phase short-pitch winding group 18 is wound so as to span the teeth $6_{13}$ and $6_{14}$.

Furthermore, the first U-phase short-pitch winding group 18 is wound so as to span the teeth $6_{15}$ and $6_{16}$. The second V-phase full-pitch winding group 19 is wound so as to span the teeth $6_{16}$, $6_{17}$ and $6_{18}$. The second W-phase full-pitch winding group 19 is wound so as to span the teeth $6_{18}$, $6_{19}$ and $6_{20}$. The second U-phase short-pitch winding group 18 is wound so as to span the teeth $6_{20}$ and $6_{21}$.

Consequently, in the present embodiment, each of the three large slots 13 makes up one two-phase slot to have both the short-pitch winding groups 18 of one short-pitch winding group pair 25 arranged therein.

More specifically, the first large slot 13, which is divided into two halves in FIG. 3 and to be formed between the teeth $6_1$ and $6_{21}$, makes up the first two-phase slot to have both the short-pitch winding groups 18 of the first short-pitch winding group pair 25 arranged therein; the first short-pitch winding group pair 25 consists of the first V-phase short-pitch winding group 18 and the second U-phase short-pitch winding group 18. The second large slot 13, which is formed between the teeth $6_7$ and $6_8$, makes up the second two-phase slot to have both the short-pitch winding groups 18 of the second short-pitch winding group pair 25 arranged therein; the second short-pitch winding group pair 25 consists of the second V-phase short-pitch winding group 18 and the first W-phase short-pitch winding group 18. The third large slot 13, which is formed between the teeth $6_{14}$ and $6_{15}$, makes up the third two-phase slot to have both the short-pitch winding groups 18 of the third short-pitch winding group pair 25 arranged therein; the third short-pitch winding group pair 25 consists of the second W-phase short-pitch winding group 18 and the first U-phase short-pitch winding group 18.

According to the present embodiment, it is possible to achieve the following advantageous effects.

In the present embodiment, the number of the short-pitch winding groups 18 per phase and the number of the full-pitch winding groups 19 per phase are set so as to respectively satisfy Equations 1 and 2. Further, all the six short-pitch winding groups 18 are arranged in pairs to form the three short-pitch winding group pairs 25.

With the above arrangement, it is possible to keep all the voltages or torques respectively induced in U, V and W phases equal to each other, thereby maintaining balance between the three phases.

Further, in the present embodiment, the total number of the slots 11 is set so as to satisfy Equation 3. The circumferential width of the large slots (or two-phase slots) 13 is substantially 2×q times the circumferential width of the small slots (or single-phase slots) 12.

With the above configuration, it is possible to arrange both the short-pitch winding groups 18 of each short-pitch winding group pair 25 in one of the large slots 13 so as not to radially overlap each other while surrounding each of all the teeth 6 of the stator core 8 with the winding groups 7. Consequently, it becomes possible to effectively utilize all the magnetic fluxes flowing in the teeth 6 of the stator core 8, thereby increasing the efficiency of the rotating electric machine 3.

Furthermore, in the present embodiment, the circumferential width of the specific teeth 14, which form the large slots 13, is set to be substantially (q+0.5) times the circumferential width of the normal teeth 15.

Setting the circumferential width of the specific teeth 14 as above, it is possible to relax magnetic saturation of the specific teeth 14, thereby increasing the winding factor of the rotating electric machine 3.

In the present embodiment, among all the protrusions 16 of the teeth 6, the circumferential width of those protrusions 16 which protrude toward the respective large slots (or two-phase slots) 13 is set to be greater than the circumferential width of the other protrusions 16 which protrude toward the respective small slots (or single-phase slots) 12.

Setting the circumferential width of the protrusions 16 protruding toward the large slots 13 as above, it is possible to more effectively utilize the magnetic fluxes flowing in the specific teeth 14 of the stator core 8.

Third Embodiment

This embodiment illustrates a stator 1 which has a configuration that is a combination of the configurations of the stators 1 according to the first and second embodiments.

Figure 5:
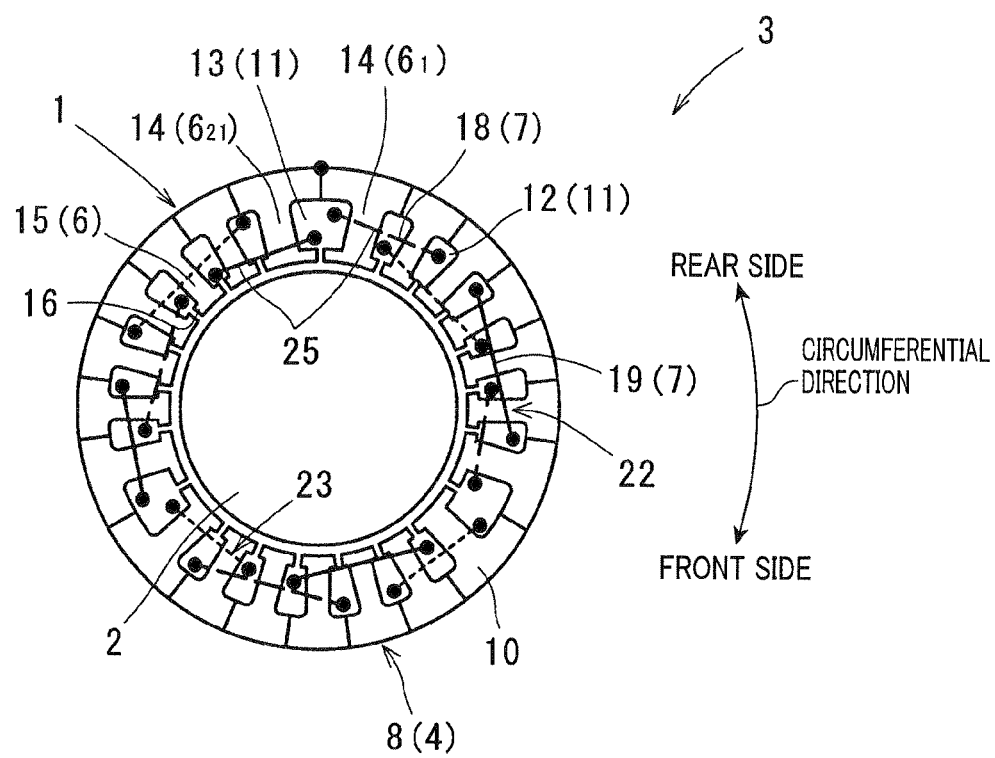
FIG. 5 is a schematic view illustrating the arrangement of the winding groups on an annular stator core which is obtained by bending the flat band-shaped stator core of FIG. 4A.

Specifically, in the present embodiment, as shown in FIGS. 4A-4B and 5, the total number S of the slots 11 (or of the teeth 6) of the stator core 4 is equal to 21. The total number of the winding groups 7 is equal to 12. That is, there are four U-phase winding groups 7, four V-phase winding groups 7 and four W-phase winding groups 7 wound on the teeth 6 of the stator core 4. In addition, the number N of poles is equal to 8 as in the previous embodiments.

Further, in the present embodiment, the slots 11 formed in the stator core 4 consist of three large slots (or two-phase slots) 13 and eighteen small slots (or single-phase slots) 12. The teeth 6 formed in the stator core 4 consist of six specific teeth 14 and fifteen normal teeth 15. More specifically, the teeth $6_1$, $6_7$, $6_8$, $6_{14}$, $6_{15}$ and $6_{21}$ are the specific teeth 14, while all the other teeth $6_2$-$6_6$, $6_9$-$6_{13}$ and $6_{16}$-$6_{20}$ are the normal teeth 15.

The three large slots 13 are arranged in the circumferential direction of the stator core 4 at a pitch equal to 120° in mechanical angle. Between each adjacent pair of the large slots 13, there are arranged six small slots 12.

Further, as shown in FIGS. 4A-4B, in the flat band-shaped stator core 5, one of the three large slots 13 is divided into two halves that are respectively located at the front and rear ends of the flat band-shaped stator core 5. Accordingly, those two of the specific teeth 14 which together form the divided large slot 13 are respectively arranged at the front and rear ends of the flat band-shaped stator core 5. In addition, as shown in FIG. 5, the two halves of the divided large slot 13 are united into one in the annular stator core 8 that is obtained by bending the flat band-shaped stator core 5 into the annular shape and joining the front and rear ends of the bent stator core 5 together.

In the present embodiment, the winding groups 7 consist of six short-pitch winding groups 18 and six full-pitch winding groups 19, which are equally assigned to the three different phases. That is, to each of U, V and W phases, there are assigned two short-pitch winding groups 18 and two full-pitch winding groups 19.

Consequently, Equations 1-3 described in the second embodiment are also satisfied in the stator 1 according to the present embodiment.

Further, in the present embodiment, as shown in FIGS. 4B and 5, three of the six short-pitch winding groups 18 and three of the six full-pitch winding groups 19 are outward-located winding groups 22, while the remaining three short-pitch winding groups 18 and three full-pitch winding groups 19 are inward-located winding groups 23. For the six outward-located winding groups 22, the short-pitch winding groups 18 are alternately arranged with the full-pitch winding groups 19 in the circumferential direction; between each circumferentially-adjacent pair of the outward-located winding groups 22, there is interposed one of the teeth 11. Similarly, for the six inward-located winding groups 23, the short-pitch winding groups 18 are alternately arranged with the full-pitch winding groups 19 in the circumferential direction; between each circumferentially-adjacent pair of the inward-located winding groups 23, there is interposed one of the teeth 11.

More specifically, for the outward-located winding groups 22, the first V-phase short-pitch winding group 18 is wound so as to span the teeth $6_1$ and $6_2$. The first U-phase full-pitch winding group 19 is wound so as to span the teeth $6_4$, $6_5$, and $6_6$. The first W-phase short-pitch winding group 18 is wound so as to span the teeth $6_8$ and $6_9$. The first V-phase full-pitch winding group 19 is wound so as to span the teeth $6_{11}$, $6_{12}$, and $6_{13}$. The first U-phase short-pitch winding group 18 is wound so as to span the teeth $6_{15}$ and $6_{16}$. The first W-phase full-pitch winding group 19 is wound so as to span the teeth $6_{18}$, $6_{19}$, and $6_{20}$.

Accordingly, for the outward-located winding groups 22, there are interposed: the tooth $6_3$ between the first V-phase short-pitch winding group 18 and the first U-phase full-pitch winding group 19 which are circumferentially adjacent to each other; the tooth $6_7$ between the first U-phase full-pitch winding group 19 and the first W-phase short-pitch winding group 18 which are circumferentially adjacent to each other; the tooth $6_{10}$ between the W-phase short-pitch winding group 18 and the first V-phase full-pitch winding group 19 which are circumferentially adjacent to each other; the tooth $6_{14}$ between the first V-phase full-pitch winding group 19 and the first U-phase short-pitch winding group 18 which are circumferentially adjacent to each other; and the tooth $6_{17}$ between the first U-phase short-pitch winding group 18 and the first W-phase full-pitch winding group 19 which are circumferentially adjacent to each other.

On the other hand, for the inward-located winding groups 23, the second W-phase full-pitch winding group 19 is wound so as to span the teeth $6_2$, $6_3$, and $6_4$. The second V-phase short-pitch winding group 18 is wound so as to span the teeth $6_6$ and $6_7$. The second U-phase full-pitch winding group 19 is wound so as to span the teeth $6_9$, $6_{10}$, and $6_{11}$. The second W-phase short-pitch winding group 18 is wound so as to span the teeth $6_{13}$ and $6_{14}$. The second V-phase full-pitch winding group 19 is wound so as to span the teeth $6_{16}$, $6_{17}$, and $6_{18}$. The second U-phase short-pitch winding group 18 is wound so as to span the teeth $6_{20}$ and $6_{21}$.

Accordingly, for the inward-located winding groups 23, there are interposed: the tooth $6_5$ between the second W-phase full-pitch winding group 19 and the second V-phase short-pitch winding group 18 which are circumferentially adjacent to each other; the tooth $6_8$ between the second V-phase short-pitch winding group 18 and the second U-phase full-pitch winding group 19 which are circumferentially adjacent to each other; the tooth $6_{12}$ between the second U-phase full-pitch winding group 19 and the second W-phase short-pitch winding group 18 which are circumferentially adjacent to each other; the tooth $6_{15}$ between the second W-phase short-pitch winding group 18 and the second V-phase full-pitch winding group 19 which are circumferentially adjacent to each other; and the tooth $6_{19}$ between the second V-phase full-pitch winding group 19 and the second U-phase short-pitch winding group 18 which are circumferentially adjacent to each other.

Consequently, in the present embodiment, all the six outward-located winding groups 22 are circumferentially spaced so as not to radially overlap each other. Similarly, all the six inward-located winding groups 23 are also circumferentially spaced so as not to radially overlap each other.

Furthermore, in the present embodiment, each of the three large slots 13 makes up one two-phase slot to have both the short-pitch winding groups 18 of one short-pitch winding group pair 25 arranged therein.

More specifically, the first large slot 13, which is divided into two halves in FIGS. 4A-4B and to be formed between the teeth $6_1$ and $6_{21}$, makes up the first two-phase slot to have both the short-pitch winding groups 18 of the first short-pitch winding group pair 25 arranged therein: the first short-pitch winding group pair 25 consists of the first V-phase short-pitch winding group 18 and the second U-phase short-pitch winding group 18. The second large slot 13, which is formed between the teeth $6_7$ and $6_8$, makes up the second two-phase slot to have both the short-pitch winding groups 18 of the second short-pitch winding group pair 25 arranged therein; the second short-pitch winding group pair 25 consists of the second V-phase short-pitch winding group 18 and the first W-phase short-pitch winding group 18. The third large slot 13, which is formed between the teeth $6_{14}$ and $6_{15}$, makes up the third two-phase slot to have both the short-pitch winding groups 18 of the third short-pitch winding group pair 25 arranged therein; the third short-pitch winding group pair 25 consists of the second W-phase short-pitch winding group 18 and the first U-phase short-pitch winding group 18.

According to the present embodiment, it is possible to achieve the following advantageous effects.

In the present embodiment, the number of the short-pitch winding groups 18 per phase and the number of the full-pitch winding groups 19 per phase are set so as to respectively satisfy Equations 1 and 2. Further, all the six short-pitch winding groups 18 are arranged in pairs to form the three short-pitch winding group pairs 25.

With the above arrangement, it is possible to keep all the voltages or torques respectively induced in U, V and W phases equal to each other, thereby maintaining balance between the three phases.

Moreover, in the present embodiment, all the outward-located winding groups 22 are spaced in the circumferential direction of the stator core 8 (or 4) so as not to intersect and radially overlap each other. All the inward-located winding groups 23 are also spaced in the circumferential direction of the stator core 8 so as not to intersect and radially overlap each other.

With the above configuration, it is possible to suitably arrange the end portions 21 of the windings of the winding groups 7 on both the axial sides of the stator core 8 without causing interference between the end portions 21. Consequently, it is possible to minimize the protruding height of the end portions 21 of the windings of the winding groups 7 from the axial end faces of the stator core 8 while securing high space factors of the windings in the slots 11 of the stator core 8.

Fourth Embodiment

This embodiment illustrates a stator 1 which has a similar configuration to the stator 1 according to the first embodiment; accordingly, only the differences therebetween will be described hereinafter.

Figure 7:
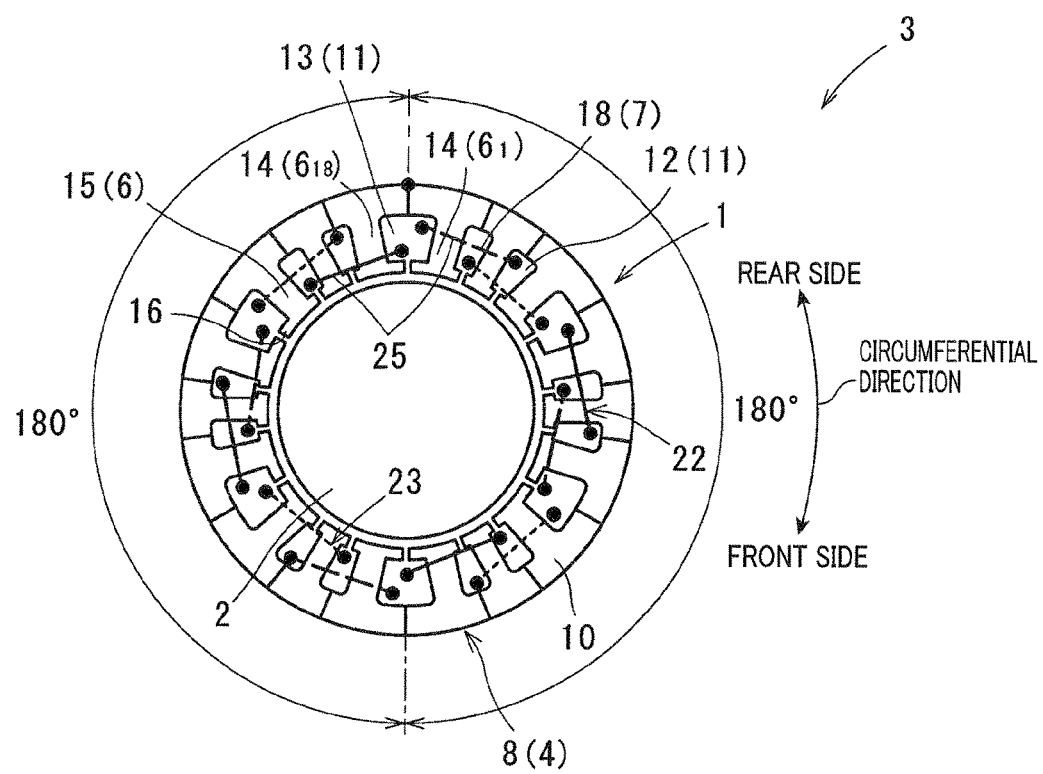
FIG. 7 is a schematic view illustrating the arrangement of the winding groups on an annular stator core which is obtained by bending the flat band-shaped stator core of FIG. 6A.

In the present embodiment, as shown in FIGS. 6A-6B and 7, the total number S of the slots 11 (or of the teeth 6) of the stator core 4 is equal to 18. The total number of the winding groups 7 is equal to 12. In addition, the number N of poles is equal to 8 as in the first embodiment.

Further, in the present embodiment, the slots 11 formed in the stator core 4 consist of six large slots (or two-phase slots) 13 and twelve small slots (or single-phase slots) 12. The teeth 6 formed in the stator core 4 consist of twelve specific teeth 14 and six normal teeth 15. More specifically, the teeth $6_1$, $6_3$, $6_4$, $6_6$, $6_7$, $6_9$, $6_{10}$, $6_{12}$, $6_{13}$, $6_{15}$, $6_{16}$ and $6_{18}$ are the specific teeth 14, while all the other teeth $6_2$, $6_5$, $6_8$, $6_{11}$, $6_{14}$ and $6_{17}$ are the normal teeth 15.

The six large slots 13 are arranged in the circumferential direction of the stator core 4 at a pitch equal to 60° in mechanical angle. Between each adjacent pair of the large slots 13, there are arranged two small slots 12.

Further, as shown in FIGS. 6A-6B, in the flat band-shaped stator core 5, one of the six large slots 13 is divided into two halves that are respectively located at the front and rear ends of the flat band-shaped stator core 5. Accordingly, those two of the specific teeth 14 which together form the divided large slot 13 are respectively arranged at the front and rear ends of the flat band-shaped stator core 5. In addition, as shown in FIG. 7, the two halves of the divided large slot 13 are united into one in the annular stator core 8 that is obtained by bending the flat band-shaped stator core 5 into the annular shape and joining the front and rear ends of the bent stator core 5 together.

In the present embodiment, each of the winding groups 7 is a short-pitch winding group 18. That is, all the twelve winding groups 7 are short-pitch winding groups 18; there is no full-pitch winding group 19 provided in the stator 1. Further, the twelve short-pitch winding groups 18 are equally assigned to the three different phases. That is, there are four U-phase short-pitch winding groups 18, four V-phase short-pitch winding groups 18 and four W-phase short-pitch winding groups 18 wound on the teeth 6 of the stator core 4.

Accordingly, in the stator 1 according to the present embodiment, the following equations are satisfied:

$$M1=4 \qquad \text{(Equation 4)}$$

$$M2=N/2-4 \qquad \text{(Equation 5)}$$

$$S=3 \times q \times N - 6 \times (2 \times q - 1) \qquad \text{Equation 6}$$

where M1 is the number of the short-pitch winding groups 18 per phase, M2 is the number of the full-pitch winding groups 19 per phase, N is an even number not less than 8 and represents the number of poles, S is the total number of the slots 11, and q is the number of the slots 11 per pole per phase.

More particularly, in the present embodiment, with N and q respectively set to 8 and 1, the resultant M1, M2 and S are respectively equal to 4, 0 and 18.

Further, in the present embodiment, as shown in FIGS. 6B and 7, six of the twelve short-pitch winding groups 18 are outward-located winding groups 22, while the remaining six short-pitch winding groups 18 are inward-located winding groups 23. The six outward-located winding groups 22 are arranged in the circumferential direction so that between each adjacent pair of the outward-located winding groups 22, there is interposed one of the specific teeth 14. Similarly, the six inward-located winding groups 23 are arranged in the circumferential direction so that between each adjacent pair of the inward-located winding groups 23, there is interposed one of the specific teeth 14.

More specifically, for the outward-located winding groups 22, the first V-phase short-pitch winding group 18 is wound so as to span the teeth $6_1$ and $6_2$. The first U-phase short-pitch winding group 18 is wound so as to span the teeth $6_4$ and $6_5$. The first W-phase short-pitch winding group 18 is wound so as to span the teeth $6_7$ and $6_8$. The second V-phase short-pitch winding group 18 is wound so as to span the teeth $6_{10}$ and $6_{11}$. The second U-phase short-pitch winding group 18 is wound so as to span the teeth $6_{13}$ and $6_{14}$. The second W-phase short-pitch winding group 18 is wound so as to span the teeth $6_{16}$ and $6_{17}$.

Accordingly, for the outward-located winding groups 22, there are interposed: the tooth $6_3$ between the first V-phase short-pitch winding group 18 and the first U-phase short-pitch winding group 18 which are circumferentially adjacent to each other; the tooth $6_6$ between the first U-phase short-pitch winding group 18 and the first W-phase short-pitch winding group 18 which are circumferentially adjacent to each other; the tooth $6_9$ between the first W-phase short-pitch winding group 18 and the second V-phase short-pitch winding group 18 which are circumferentially adjacent to each other; the tooth $6_{12}$ between the second V-phase short-pitch winding group 18 and the second U-phase short-pitch winding group 18 which are circumferentially adjacent to each other; and the tooth $6_{15}$ between the second U-phase short-pitch winding group 18 and the second W-phase short-pitch winding group 18 which are circumferentially adjacent to each other.

On the other hand, for the inward-located winding groups 23, the third W-phase short-pitch winding group 18 is wound so as to span the teeth $6_2$ and $6_3$. The third V-phase short-pitch winding group 18 is wound so as to span the teeth $6_5$ and $6_6$. The third U-phase short-pitch winding group 18 is wound so as to span the teeth $6_8$ and $6_9$. The fourth W-phase short-pitch winding group 18 is wound so as to span the teeth $6_{11}$ and $6_{12}$. The fourth V-phase short-pitch winding group 18 is wound so as to span the teeth $6_{14}$ and $6_{15}$. The fourth U-phase short-pitch winding group 18 is wound so as to span the teeth $6_{17}$ and $6_{18}$.

Accordingly, for the inward-located winding groups 23, there are interposed: the tooth $6_4$ between the third W-phase short-pitch winding group 18 and the third V-phase short-pitch winding group 18 which are circumferentially adjacent to each other; the tooth $6_7$ between the third V-phase short-pitch winding group 18 and the third U-phase short-pitch winding group 18 which are circumferentially adjacent to each other; the tooth $6_{10}$ between the third U-phase short-pitch winding group 18 and the fourth W-phase short-pitch winding group 18 which are circumferentially adjacent to each other; the tooth $6_{13}$ between the fourth W-phase short-pitch winding group 18 and the fourth V-phase short-pitch winding group 18 which are circumferentially adjacent to each other; and the tooth $6_{16}$ between the fourth V-phase short-pitch winding group 18 and the fourth U-phase short-pitch winding group 18 which are circumferentially adjacent to each other.

Consequently, in the present embodiment, all the six outward-located winding groups 22 are circumferentially spaced so as not to radially overlap each other. Similarly, all the six inward-located winding groups 23 are also circumferentially spaced so as not to radially overlap each other.

Furthermore, in the present embodiment, as shown in FIGS. 6A-6B, the phases (i.e., U, V and W) of all the winding groups 7 are arranged in a pattern which is repeated for every 180° in mechanical angle. In other words, the same pattern of arranging the phases of the winding groups 7 is repeated twice in the circumferential direction of the annular stator core 8 as shown in FIG. 7.

Moreover, in the present embodiment, each of the six large slots 13 makes up one two-phase slot to have both the short-pitch winding groups 18 of one short-pitch winding group pair 25 arranged therein.

More specifically, the first large slot 13, which is divided into two halves in FIGS. 6A-6B and to be formed between the teeth $6_1$ and $6_{18}$, makes up the first two-phase slot to have both the short-pitch winding groups 18 of the first short-pitch winding group pair 25 arranged therein: the first short-pitch winding group pair 25 consists of the first V-phase short-pitch winding group 18 and the fourth U-phase short-pitch winding group 18. The second large slot 13, which is formed between the teeth $6_3$ and $6_4$, makes up the second two-phase slot to have both the short-pitch winding groups 18 of the second short-pitch winding group pair 25 arranged therein; the second short-pitch winding group pair 25 consists of the first U-phase short-pitch winding group 18 and the third W-phase short-pitch winding group 18. The third large slot 13, which is formed between the teeth $6_6$ and $6_7$, makes up the third two-phase slot to have both the short-pitch winding groups 18 of the third short-pitch winding group pair 25 arranged therein; the third short-pitch winding group pair 25 consists of the first W-phase short-pitch winding group 18 and the third V-phase short-pitch winding group 18. The fourth large slot 13, which is formed between the teeth $6_9$ and $6_{10}$, makes up the fourth two-phase slot to have both the short-pitch winding groups 18 of the fourth short-pitch winding group pair 25 arranged therein; the fourth short-pitch winding group pair 25 consists of the second V-phase short-pitch winding group 18 and the third U-phase short-pitch winding group 18. The fifth large slot 13, which is formed between the teeth $6_{12}$ and $6_{13}$, makes up the fifth two-phase slot to have both the short-pitch winding groups 18 of the fifth short-pitch winding group pair 25 arranged therein; the fifth short-pitch winding group pair 25 consists of the second U-phase short-pitch winding group 18 and the fourth W-phase short-pitch winding group 18. The sixth large slot 13, which is formed between the teeth $6_{15}$ and $6_{16}$, makes up the sixth two-phase slot to have both the short-pitch winding groups 18 of the sixth short-pitch winding group pair 25 arranged therein; the sixth short-pitch winding group pair 25 consists of the second W-phase short-pitch winding group 18 and the fourth V-phase short-pitch winding group 18.

According to the present embodiment, it is possible to achieve the following advantageous effects.

In the present embodiment, the number of the short-pitch winding groups 18 per phase and the number of the full-pitch winding groups 19 per phase are set so as to respectively satisfy Equations 4 and 5. Further, all the twelve short-pitch winding groups 18 are arranged in pairs to form the six short-pitch winding group pairs 25. Furthermore, the same pattern of arranging the phases of the winding groups 7 is repeated for every 180° in mechanical angle.

With the above arrangement, it is possible to keep all the voltages or torques respectively induced in U, V and W phases equal to each other, thereby maintaining balance between the three phases.

Moreover, with the above arrangement, it is also possible to balance radial force acting between the stator 1 and the rotor 2 in the rotating electric machine 3.

Figure 8A:
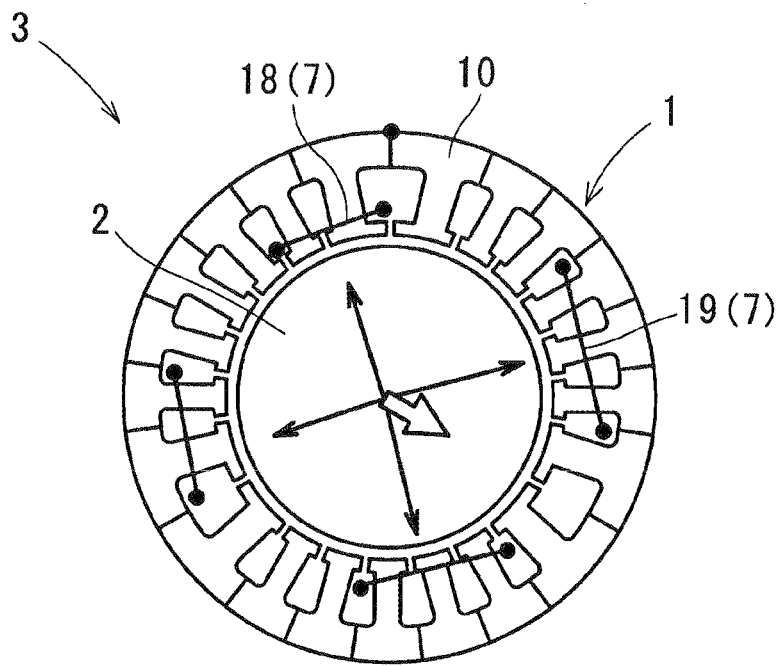
FIGS. 8A and 8B are schematic views together illustrating an advantageous effect that can be achieved according to the fourth embodiment.
Figure 8B:
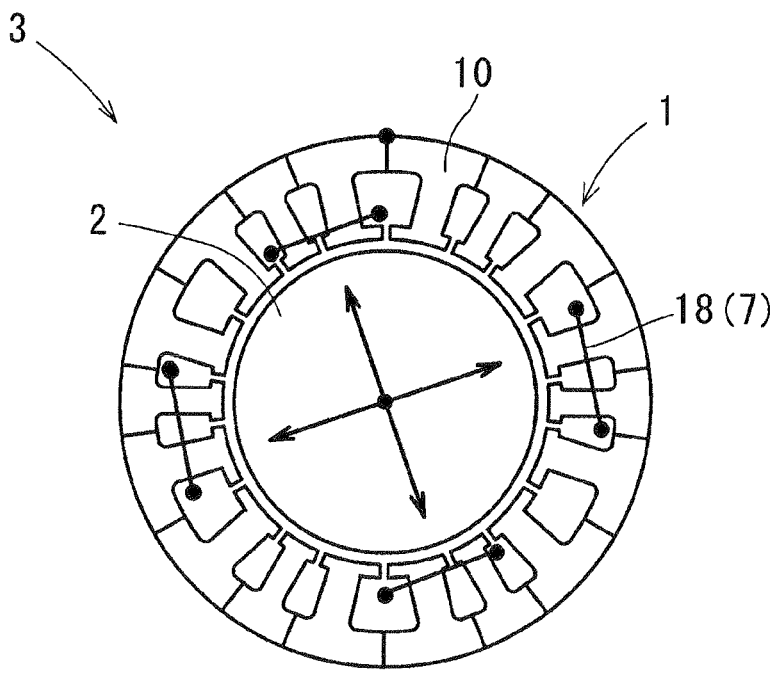

For example, as shown in FIG. 8A, with the stator 1 according to the third embodiment, the resultant of magnetic attraction forces created by electric currents flowing in the winding groups 7 may not become zero. Consequently, it may be difficult to balance radial force acting between the stator 1 and the rotor 2. In comparison, as shown in FIG. 8B, with the stator 1 according to the present embodiment, the resultant of magnetic attraction forces created by electric currents flowing in the winding groups 7 will become substantially zero. Consequently, it is possible to balance radial force acting between the stator 1 and the rotor 2.

Further, in the present embodiment, the total number of the slots 11 is set so as to satisfy Equation 6. The circumferential width of the large slots (or two-phase slots) 13 is substantially 2×q times the circumferential width of the small slots (or single-phase slots) 12.

With the above configuration, it is possible to arrange both the short-pitch winding groups 18 of each short-pitch winding group pair 25 in one of the large slots 13 so as not to radially overlap each other while surrounding each of all the teeth 6 of the stator core 8 with the winding groups 7. Consequently, it becomes possible to effectively utilize all the magnetic fluxes flowing in the teeth 6 of the stator core 8, thereby increasing the efficiency of the rotating electric machine 3.

Furthermore, in the present embodiment, the circumferential width of the specific teeth 14, which form the large slots 13, is set to be substantially (q+0.5) times the circumferential width of the normal teeth 15.

Setting the circumferential width of the specific teeth 14 as above, it is possible to relax magnetic saturation of the specific teeth 14, thereby increasing the winding factor of the rotating electric machine 3.

In the present embodiment, among all the protrusions 16 of the teeth 6, the circumferential width of those protrusions 16 which protrude toward the respective large slots (or two-phase slots) 13 is set to be greater than the circumferential width of the other protrusions 16 which protrude toward the respective small slots (or single-phase slots) 12.

Setting the circumferential width of the protrusions 16 protruding toward the large slots 13 as above, it is possible to more effectively utilize the magnetic fluxes flowing in the specific teeth 14 of the stator core 8.

Fifth Embodiment

FIG. 9 shows the configuration of a stator 1 according to a fifth embodiment.

In the present embodiment, the number N of poles is equal to 16. The total number S of the slots 11 (or of the teeth 6) of the stator core 4 is equal to 48. The total number of the winding groups 7 is equal to 24. That is, there are eight U-phase winding groups 7, eight V-phase winding groups 7 and eight W-phase winding groups 7 wound on the teeth 6 of the stator core 4.

Further, in the present embodiment, each of the slots 11 is configured as a small slot (or single-phase slot) 12. That is, all the slots 11 are small slots 12; there is no large slot (or two-phase slot) 13 formed in the stator core 4.

Accordingly, in the present embodiment, each of the teeth 6 is configured as a normal tooth 15. That is, all the teeth 6 are normal teeth 15; there is no specific tooth 14 formed in the stator core 4. In addition, none of the teeth 6 has any protrusions 16 formed at its distal end.

In the present embodiment, the winding groups 7 consist of six short-pitch winding groups 18 and eighteen full-pitch winding groups 19, which are equally assigned to the three different phases. That is, to each of U, V and W phases, there are assigned two short-pitch winding groups 18 and six full-pitch winding groups 19.

Accordingly, Equations 1 and 2 described in the second embodiment are also satisfied in the stator 1 according to the present embodiment.

Further, in the present embodiment, twelve of the twenty-four winding groups 7 are outward-located winding groups 22, while the remaining twelve winding groups 7 are inward-located winding groups 23. The twelve outward-located winding groups 22 are arranged in a first pattern which is repeated three times in the circumferential direction of the stator core 4; in the first pattern, one short-pitch winding group 18 and three full-pitch winding groups 19 are sequentially arranged from the rear side to the front side in the circumferential direction. On the other hand, the twelve inward-located windings 23 are arranged in a second pattern which is also repeated three times in the circumferential direction of the stator core 4; in the second pattern, three full-pitch winding groups 19 and one short-pitch winding group 18 are sequentially arranged from the rear side to the front side in the circumferential direction.

More specifically, as shown in FIG. 9, for the outward-located winding groups 22, the first V-phase short-pitch winding group 18 is wound so as to span the teeth $6_2$ and $6_3$; the first U-phase, the first W-phase and the first V-phase full-pitch winding groups 19 are wound so as to span the teeth $6_5$-$6_7$, $6_9$-$6_{11}$ and $6_{13}$-$6_{15}$, respectively. Further, the first U-phase short-pitch winding group 18 is wound so as to span the teeth $6_{18}$ and $6_{19}$; the second W-phase, the second V-phase and the second U-phase full-pitch winding groups 19 are wound so as to span the teeth $6_{21}$-$6_{23}$, $6_{25}$-$6_{27}$ and $6_{29}$-$6_{31}$, respectively. Furthermore, the first W-phase short-pitch winding group 18 is wound so as to span the teeth $6_{34}$ and $6_{35}$; the third V-phase, the third U-phase and the third W-phase full-pitch winding groups 19 are wound so as to span the teeth $6_{37}$-$6_{39}$, $6_{41}$-$6_{43}$ and $6_{45}$-$6_{47}$, respectively.

On the other hand, for the inward-located winding groups 23, the fourth W-phase, the fourth V-phase and the fourth U-phase full-pitch winding groups 19 are wound so as to span the teeth $6_3$-$6_5$, $6_7$-$6_9$ and $6_{11}$-$6_{13}$, respectively; the second W-phase short-pitch winding group 18 is wound so as to span the teeth $6_{15}$ and $6_{16}$. Further, the fifth V-phase, the fifth U-phase and the fifth W-phase full-pitch winding groups 19 are wound so as to span the teeth $6_{19}$-$6_{21}$, $6_{23}$-$6_{25}$ and $6_{27}$-$6_{29}$, respectively; the second V-phase short-pitch winding group 18 is wound so as to span the teeth $6_{31}$ and $6_{32}$. Furthermore, the sixth U-phase, the sixth W-phase and the sixth V-phase full-pitch winding groups 19 are wound so as to span the teeth $6_{35}$-$6_{37}$, $6_{39}$-$6_{41}$ and $6_{43}$-$6_{45}$/respectively; the second U-phase short-pitch winding group 18 is wound so as to span the teeth $6_{47}$ and $6_{48}$.

Consequently, in the present embodiment, all the six short-pitch winding groups 18 are arranged in pairs to form three short-pitch winding group pairs 25. For each of the short-pitch winding group pairs 25, the two short-pitch winding groups 18 of the pair are circumferentially adjacent to each other with one of the teeth 6 interposed therebetween.

More specifically, the first short-pitch winding group pair 25 consists of the first V-phase short-pitch winding group 18 and the second U-phase short-pitch winding group 18 which are circumferentially adjacent to each other with the tooth $6_1$ interposed between. The second short-pitch winding group pair 25 consists of the first U-phase short-pitch winding group 18 and the second W-phase short-pitch winding group 18 which are circumferentially adjacent to each other with the tooth $6_{17}$ interposed between. The third short-pitch winding group pair 25 consists of the first W-phase short-pitch winding group 18 and the second V-phase short-pitch winding group 18 which are circumferentially adjacent to each other with the tooth 6₃₃ interposed between.

According to the present embodiment, it is possible to achieve the following advantageous effects.

In the present embodiment, the winding groups 7 include the three short-pitch winding group pairs 25. Therefore, it is possible to arrange the two short-pitch winding groups 18 of one of the three short-pitch winding group pairs 25 (e.g., the second U-phase short-pitch winding group 18 and the first V-phase short-pitch winding group 18 of the first short-pitch winding group pair 25) respectively at the front and rear ends of the flat band-shaped stator core 5 without dividing any of the winding groups 7 into two segments. Consequently, it becomes possible to eliminate the step of joining the two segments 104 to restore the divided winding group 103 in the conventional method described previously (see FIG. 19). As a result, the manufacturing process of the stator 1 can be simplified, thereby improving the productivity of the stator 1.

Moreover, in the present embodiment, the number of the short-pitch winding groups 18 per phase and the number of the full-pitch winding groups 19 per phase are set so as to respectively satisfy Equations 1 and 2. Further, all the six short-pitch winding groups 18 are arranged in pairs to form the three short-pitch winding group pairs 25.

With the above arrangement, it is possible to keep all the voltages or torques respectively induced in U, V and W phases equal to each other, thereby maintaining balance between the three phases.

Furthermore, in the present embodiment, all the outward-located winding groups 22 are spaced in the circumferential direction of the stator core 4 (or 8) so as not to intersect and radially overlap each other. All the inward-located winding groups 23 are also spaced in the circumferential direction of the stator core 4 so as not to intersect and radially overlap each other.

With the above configuration, it is possible to suitably arrange the end portions 21 of the windings of the winding groups 7 on both the axial sides of the stator core 4 without causing interference between the end portions 21. Consequently, it is possible to minimize the protruding height of the end portions 21 of the windings of the winding groups 7 from the axial end faces of the stator core 4 while securing high space factors of the windings in the slots 11 of the stator core 4.

Sixth Embodiment

This embodiment illustrates a stator 1 which has a similar configuration to the stator 1 according to the fifth embodiment; accordingly, only the differences therebetween will be described hereinafter.

As shown in FIG. 10, the flat band-shaped stator core 5 in the present embodiment is obtained by removing the teeth 6₁, 6₁₇ and 6₃₃ from the flat band-shaped stator core 5 in the fifth embodiment (see FIG. 9). As described previously, in the fifth embodiment, each of the teeth 6₁, 6₁₇ and 6₃₃ is interposed between the two short-pitch winding groups 18 of one of the three short-pitch winding group pairs 25.

Consequently, in the present embodiment, the total number S of the slots 11 (or the total number of the teeth 6) is reduced to 45. Further, by removing the three teeth, there are formed three large slots 13 in the flat band-shaped stator core 5 (also in the annular stator core 8). Accordingly, the teeth 6₁, 6₁₅, 6₁₆, 6₃₀, 6₃₁ and 6₄₅ become specific teeth 14.

Furthermore, in the present embodiment, each of the three large slots 13 makes up one two-phase slot to have both the short-pitch winding groups 18 of one of the three short-pitch winding group pairs 25 arranged therein. Moreover, the circumferential width of the large slots 13 is set to be substantially twice the circumferential with of the other slots 11 (i.e., the small slots 12).

Accordingly, in the present embodiment, the total number S of the slots 11 satisfies Equation 3. The circumferential width of the large slots (or two-phase slots) 13 is substantially 2×q times the circumferential width of the other slots 11.

With the above configuration, it is possible to arrange both the short-pitch winding groups 18 of each short-pitch winding group pair 25 in one of the large slots 13 so as not to radially overlap each other while surrounding each of all the teeth 6 of the stator core 4 (or 8) with the winding groups 7. Consequently, it becomes possible to effectively utilize all the magnetic fluxes flowing in the teeth 6 of the stator core 8, thereby increasing the efficiency of the rotating electric machine 3.

Seventh Embodiment

This embodiment illustrates a stator 1 which has a similar configuration to the stator 1 according to the sixth embodiment; accordingly, only the differences therebetween will be described hereinafter.

Figure 11:
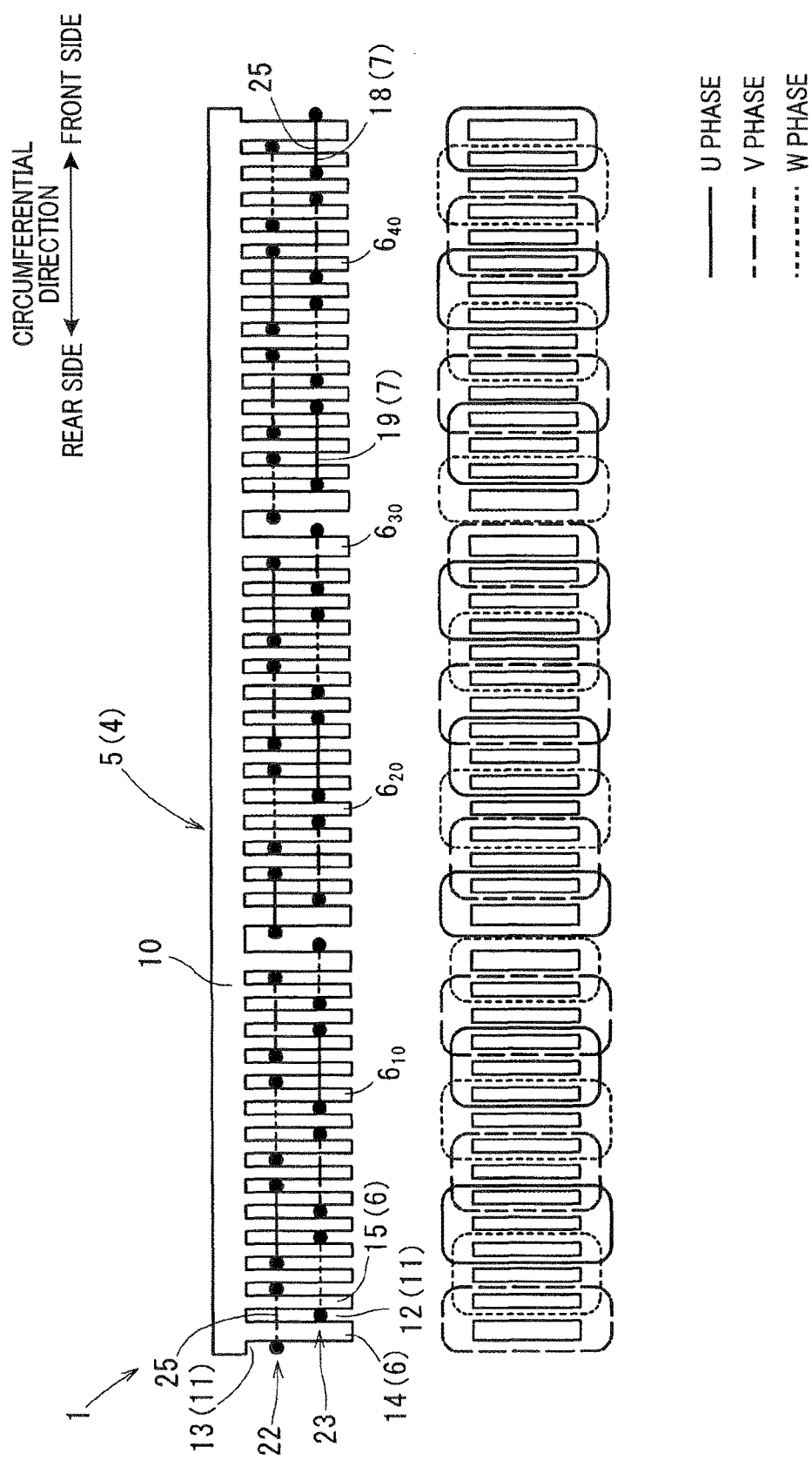
FIG. 11 is a schematic view illustrating the arrangement of a plurality of winding groups on a flat band-shaped stator core according to a seventh embodiment.

Compared to the sixth embodiment (see FIG. 10), in the present embodiment, as shown in FIG. 11, the circumferential width of the specific teeth 14 is increased to be substantially 1.5 times the circumferential width of the other teeth 6 (i.e., the normal teeth 15).

That is, in the present embodiment, the circumferential width of the specific teeth 14 is set to be substantially (q+0.5) times the circumferential width of the other teeth 6.

Setting the circumferential width of the specific teeth 14 as above, it is possible to relax magnetic saturation of the specific teeth 14, thereby increasing the winding factor of the rotating electric machine 3.

Eighth Embodiment

This embodiment illustrates a stator 1 which has a similar configuration to the stator 1 according to the fifth embodiment; accordingly, only the differences therebetween will be described hereinafter.

Figure 12:
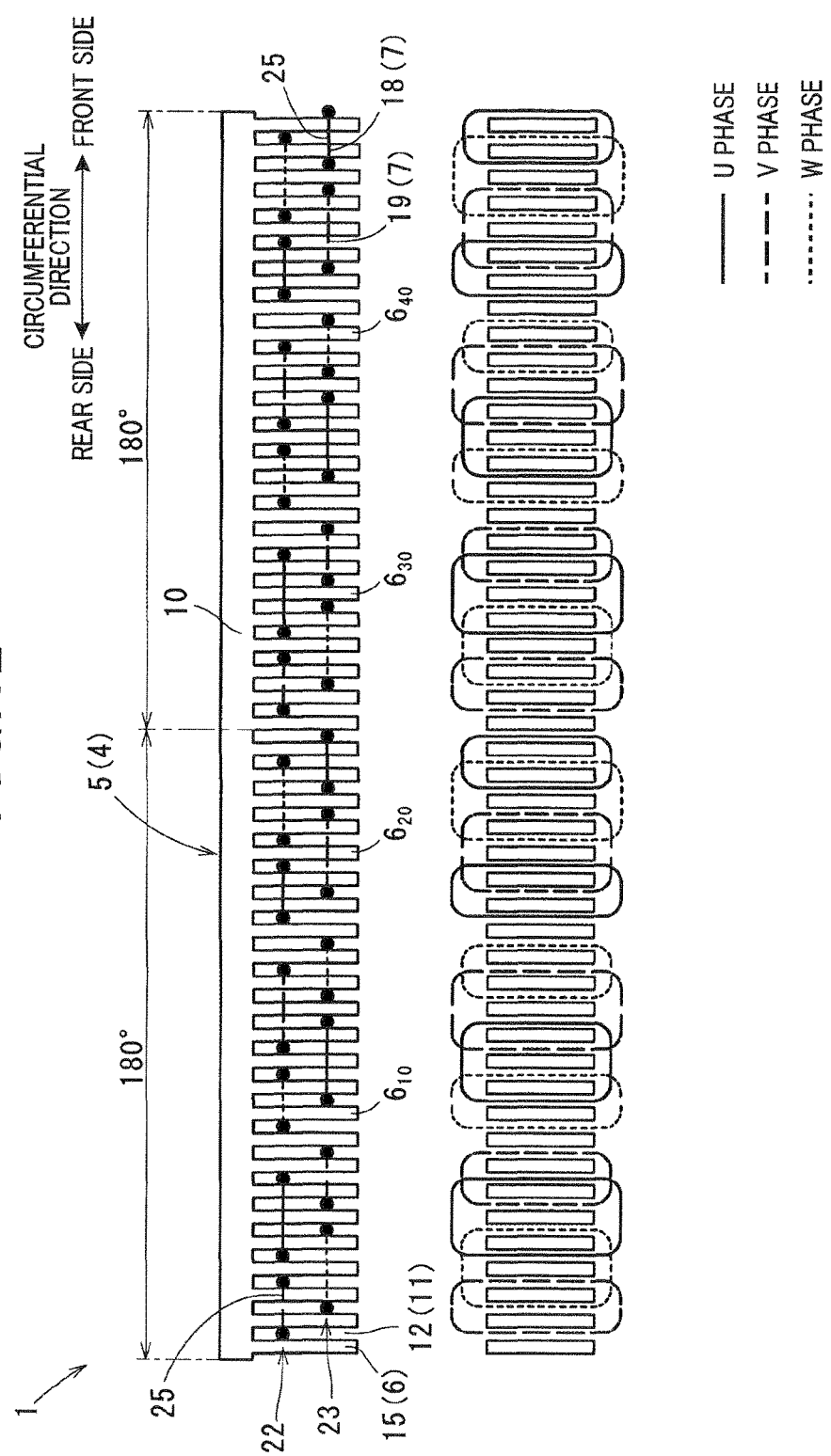
FIG. 12 is a schematic view illustrating the arrangement of a plurality of winding groups on a flat band-shaped stator core according to an eighth embodiment.

In the present embodiment, as shown in FIG. 12, the configuration of the flat band-shaped stator core 5 (thus the configuration of the annular stator core 8) is the same as in the fifth embodiment (see FIG. 9). That is, the total number S of the slots 11 (or of the teeth 6) is equal to 48. All the slots 11 are small slots 12; thus all the teeth 6 are normal teeth 15. In addition, none of the teeth 6 has any protrusions 16 formed at its distal end.

Moreover, in the present embodiment, the number N of poles and the total number of the winding groups 7 are respectively equal to 16 and 24, as in the fifth embodiment.

However, compared to the fifth embodiment where the winding groups 7 consist of the six short-pitch winding groups 18 and the eighteen full-pitch winding groups 19, in the present embodiment, the winding groups 7 consist of twelve short-pitch winding groups 18 and twelve full-pitch winding groups 19.

Further, in the present embodiment, the twelve short-pitch winding groups 18 and the twelve full-pitch winding groups 19 are equally assigned to the three different phases. That is, to each of U, V and W phases, there are assigned four short-pitch winding groups 18 and four full-pitch winding groups 19.

Accordingly, Equations 4 and 5 described in the fourth embodiment are also satisfied in the stator 1 according to the present embodiment.

Further, in the present embodiment, six of the twelve short-pitch winding groups 18 are outward-located winding groups 22, while the remaining six short-pitch winding groups 18 are inward-located winding groups 23. Similarly, six of the twelve full-pitch winding groups 19 are outward-located winding groups 22, while the remaining six full-pitch winding groups 19 are inward-located winding groups 23.

Furthermore, in the present embodiment, all the outward-located winding groups 22 are arranged so that the six short-pitch winding groups 18 are alternately positioned in the circumferential direction with the six full-pitch winding groups 19. Similarly, all the inward-located winding groups 23 are arranged so that the six short-pitch winding groups 18 are alternately positioned in the circumferential direction with the six full-pitch winding groups 19.

More specifically, as shown in FIG. 12, for the outward-located winding groups 22, the first V-phase short-pitch winding group 18 is wound so as to span the teeth $6_2$ and $6_3$. The first U-phase full-pitch winding group 19 is wound so as to span the teeth $6_5$, $6_6$ and $6_7$. The first W-phase short-pitch winding group 18 is wound so as to span the teeth $6_{10}$ and $6_{11}$. The first V-phase full-pitch winding group 19 is wound so as to span the teeth $6_{13}$, $6_{14}$ and $6_{15}$. The first U-phase short-pitch winding group 18 is wound so as to span the teeth $6_{18}$ and $6_{19}$. The first W-phase full-pitch winding group 19 is wound so as to span the teeth $6_{21}$, $6_{22}$ and $6_{23}$.

Further, for the outward-located winding groups 22, the second V-phase short-pitch winding group 18 is wound so as to span the teeth $6_{26}$ and $6_{27}$. The second U-phase full-pitch winding group 19 is wound so as to span the teeth $6_{29}$, $6_{30}$ and $6_{31}$. The second W-phase short-pitch winding group 18 is wound so as to span the teeth $6_{34}$ and $6_{35}$. The second V-phase full-pitch winding group 19 is wound so as to span the teeth $6_{37}$, $6_{38}$ and $6_{39}$. The second U-phase short-pitch winding group 18 is wound so as to span the teeth $6_{42}$ and $6_{43}$. The second W-phase full-pitch winding group 19 is wound so as to span the teeth $6_{45}$, $6_{46}$ and $6_{47}$.

On the other hand, for the inward-located winding groups 23, the third W-phase full-pitch winding group 19 is wound so as to span the teeth $6_3$, $6_4$ and $6_5$. The third V-phase short-pitch winding group 18 is wound so as to span the teeth $6_7$ and $6_8$. The third U-phase full-pitch winding group 19 is wound so as to span the teeth $6_{11}$, $6_{12}$ and $6_{13}$. The third W-phase short-pitch winding group 18 is wound so as to span the teeth $6_{15}$ and $6_{16}$. The third V-phase full-pitch winding group 19 is wound so as to span the teeth $6_{19}$, $6_{20}$ and $6_{21}$. The third U-phase short-pitch winding group 18 is wound so as to span the teeth $6_{23}$ and $6_{24}$.

Further, for the inward-located winding groups 23, the fourth W-phase full-pitch winding group 19 is wound so as to span the teeth $6_{27}$, $6_{28}$ and $6_{29}$. The fourth V-phase short-pitch winding group 18 is wound so as to span the teeth $6_{31}$ and $6_{32}$. The fourth U-phase full-pitch winding group 19 is wound so as to span the teeth $6_{35}$, $6_{36}$ and $6_{37}$. The fourth W-phase short-pitch winding group 18 is wound so as to span the teeth $6_{39}$ and $6_{40}$. The fourth V-phase full-pitch winding group 19 is wound so as to span the teeth $6_{43}$, $6_{44}$ and $6_{45}$. The fourth U-phase short-pitch winding group 18 is wound so as to span the teeth $6_{47}$ and $6_{48}$.

Consequently, in the present embodiment, all the twelve outward-located winding groups 22 are circumferentially spaced so as not to radially overlap each other. Similarly, all the twelve inward-located winding groups 23 are also circumferentially spaced so as not to radially overlap each other. Further, the phases (i.e., U, V and W) of all the winding groups 7 are arranged in a pattern which is repeated for every 180° in mechanical angle. In other words, the same pattern of arranging the phases of the winding groups 7 is repeated twice in the circumferential direction of the stator core 4.

Furthermore, in the present embodiment, all the twelve short-pitch winding groups 18 are arranged in pairs to form six short-pitch winding group pairs 25. For each of the short-pitch winding group pairs 25, the two short-pitch winding groups 18 of the pair are circumferentially adjacent to each other with one of the teeth 6 interposed therebetween.

More specifically, the first short-pitch winding group pair 25 consists of the first V-phase short-pitch winding group 18 and the fourth U-phase short-pitch winding group 18 which are circumferentially adjacent to each other with the tooth $6_1$ interposed between. The second short-pitch winding group pair 25 consists of the first W-phase short-pitch winding group 18 and the third V-phase short-pitch winding group 18 which are circumferentially adjacent to each other with the tooth $6_9$ interposed between. The third short-pitch winding group pair 25 consists of the first U-phase short-pitch winding group 18 and the third W-phase short-pitch winding group 18 which are circumferentially adjacent to each other with the tooth $6_{17}$ interposed between. The fourth short-pitch winding group pair 25 consists of the second V-phase short-pitch winding group 18 and the third U-phase short-pitch winding group 18 which are circumferentially adjacent to each other with the tooth $6_{25}$ interposed between. The fifth short-pitch winding group pair 25 consists of the second W-phase short-pitch winding group 18 and the fourth V-phase short-pitch winding group 18 which are circumferentially adjacent to each other with the tooth $6_{33}$ interposed between. The sixth short-pitch winding group pair 25 consists of the second U-phase short-pitch winding group 18 and the fourth W-phase short-pitch winding group 18 which are circumferentially adjacent to each other with the tooth $6_{41}$ interposed between.

According to the present embodiment, it is possible to achieve the following advantageous effects.

In the present embodiment, the winding groups 7 include the six short-pitch winding group pairs 25. Therefore, it is possible to arrange the two short-pitch winding groups 18 of one of the six short-pitch winding group pairs 25 (e.g., the first V-phase short-pitch winding group 18 and the fourth U-phase short-pitch winding group 18 of the first short-pitch winding group pair 25) respectively at the front and rear ends of the flat band-shaped stator core 5 without dividing any of the winding groups 7 into two segments. Consequently, it becomes possible to eliminate the step of joining the two segments 104 to restore the divided winding group 103 in the conventional method described previously (see FIG. 19). As a result, the manufacturing process of the stator 1 can be simplified, thereby improving the productivity of the stator 1.

Moreover, in the present embodiment, the number of the short-pitch winding groups 18 per phase and the number of the full-pitch winding groups 19 per phase are set so as to respectively satisfy Equations 4 and 5. Further, all the twelve short-pitch winding groups 18 are arranged in pairs to form the six short-pitch winding group pairs 25. Furthermore, the same pattern of arranging the phases of the winding groups 7 is repeated for every 180° in mechanical angle.

With the above arrangement, it is possible to keep all the voltages or torques respectively induced in U, V and W phases equal to each other, thereby maintaining balance between the three phases.

In addition, in the present embodiment, all the outward-located winding groups 22 are spaced in the circumferential direction of the stator core 4 (or 8) so as not to intersect and radially overlap each other. All the inward-located winding groups 23 are also spaced in the circumferential direction of the stator core 4 so as not to intersect and radially overlap each other.

With the above configuration, it is possible to suitably arrange the end portions 21 of the windings of the winding groups 7 on both the axial sides of the stator core 4 without causing interference between the end portions 21. Consequently, it is possible to minimize the protruding height of the end portions 21 of the windings of the winding groups 7 from the axial end faces of the stator core 4 while securing high space factors of the windings in the slots 11 of the stator core 4.

Ninth Embodiment

This embodiment illustrates a stator 1 which has a similar configuration to the stator 1 according to the eighth embodiment; accordingly, only the differences therebetween will be described hereinafter.

Figure 13:
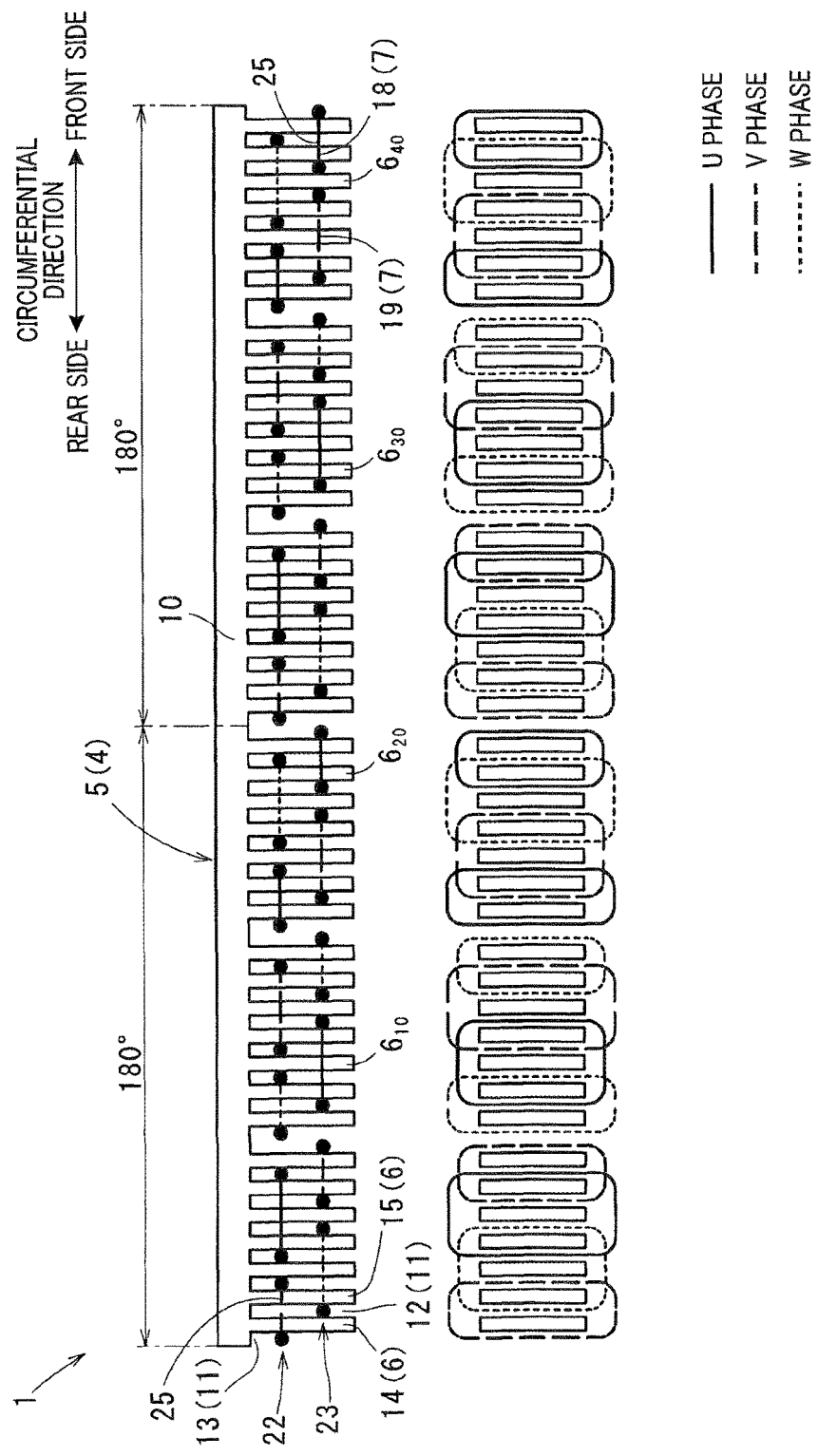
FIG. 13 is a schematic view illustrating the arrangement of a plurality of winding groups on a flat band-shaped stator core according to a ninth embodiment.

As shown in FIG. 13, the flat band-shaped stator core 5 in the present embodiment is obtained by removing the teeth $6_1$, $6_9$, $6_{17}$, $6_{25}$, $6_{33}$ and $6_{41}$ from the flat band-shaped stator core 5 in the eighth embodiment (see FIG. 12). As described previously, in the eighth embodiment, each of the teeth $6_1$, $6_9$, $6_{17}$, $6_{25}$, $6_{33}$ and $6_{41}$ is interposed between the two short-pitch winding groups 18 of one of the six short-pitch winding group pairs 25.

Consequently, in the present embodiment, the total number S of the slots 11 (or the total number of the teeth 6) is reduced to 42. Further, by removing the six teeth, there are formed six large slots 13 in the flat band-shaped stator core 5 (also in the annular stator core 8). Accordingly, the teeth $6_1$, $6_7$, $6_8$, $6_{14}$, $6_{15}$, $6_{21}$, $6_{22}$, $6_{28}$, $6_{29}$, $6_{35}$, $6_{36}$ and $6_{42}$ become specific teeth 14.

Furthermore, in the present embodiment, each of the sixth large slots 13 makes up one two-phase slot to have both the short-pitch winding groups 18 of one of the six short-pitch winding group pairs 25 arranged therein. Moreover, the circumferential width of the large slots 13 is set to be substantially twice the circumferential with of the other slots 11 (i.e., the small slots 12).

Accordingly, in the present embodiment, the total number S of the slots 11 satisfies Equation 6. The circumferential width of the large slots (or two-phase slots) 13 is substantially 2×q times the circumferential width of the other slots 11.

With the above configuration, it is possible to arrange both the short-pitch winding groups 18 of each short-pitch winding group pair 25 in one of the large slots 13 so as not to radially overlap each other while surrounding each of all the teeth 6 of the stator core 4 (or 8) with the winding groups 7. Consequently, it becomes possible to effectively utilize all the magnetic fluxes flowing in the teeth 6 of the stator core 8, thereby increasing the efficiency of the rotating electric machine 3.

Tenth Embodiment

This embodiment illustrates a stator 1 which has a similar configuration to the stator 1 according to the ninth embodiment; accordingly, only the differences therebetween will be described hereinafter.

Figure 14:
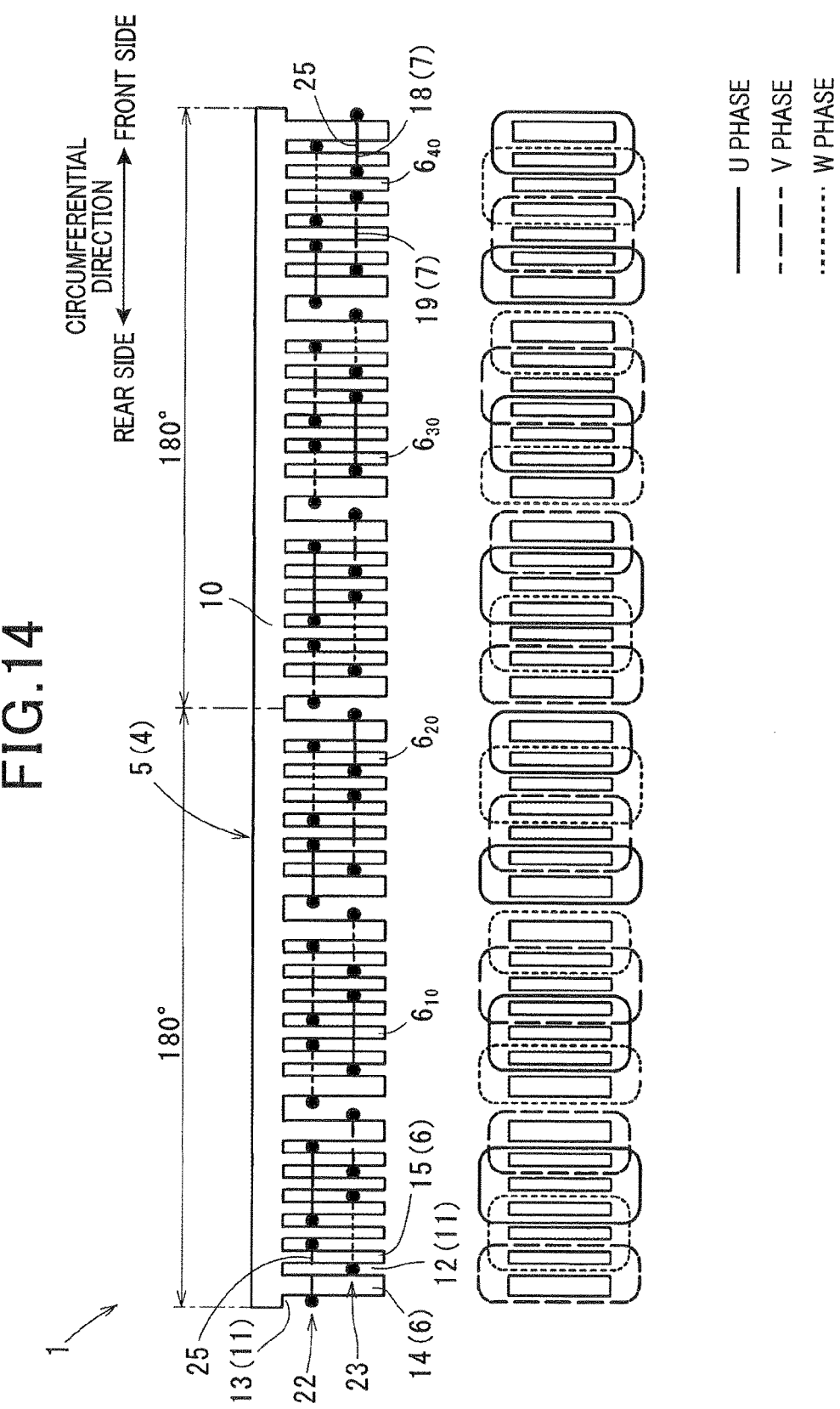
FIG. 14 is a schematic view illustrating the arrangement of a plurality of winding groups on a flat band-shaped stator core according to a tenth embodiment.

Compared to the ninth embodiment (see FIG. 13), in the present embodiment, as shown in FIG. 14, the circumferential width of the specific teeth 14 is increased to be substantially 1.5 times the circumferential width of the other teeth 6 (i.e., the normal teeth 15).

That is, in the present embodiment, the circumferential width of the specific teeth 14 is set to be substantially (q+0.5) times the circumferential width of the other teeth 6.

Setting the circumferential width of the specific teeth 14 as above, it is possible to relax magnetic saturation of the specific teeth 14, thereby increasing the winding factor of the rotating electric machine 3.

Eleventh Embodiment

This embodiment illustrates a stator 1 which has a similar configuration to the stator 1 according to the tenth embodiment; accordingly, only the differences therebetween will be described hereinafter.

Figure 15:
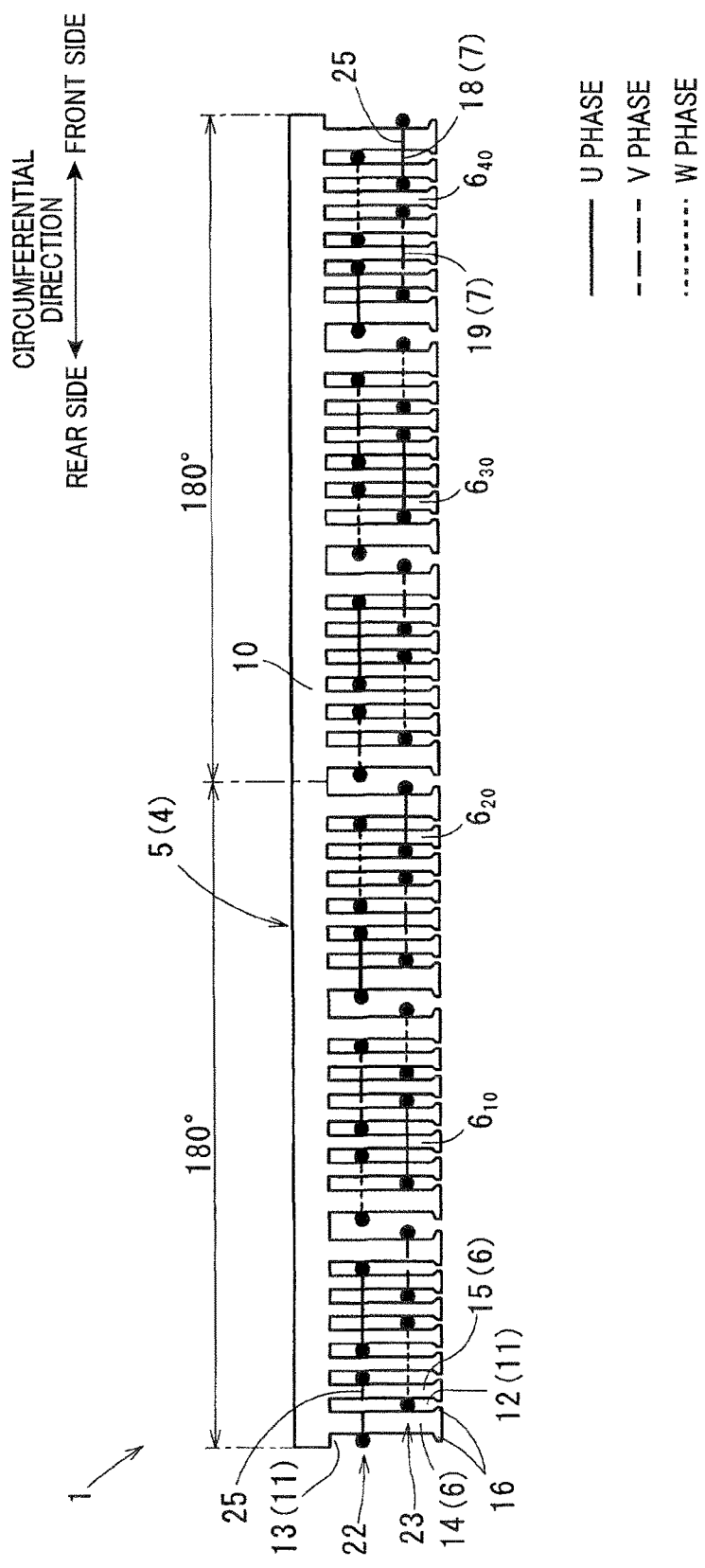
FIG. 15 is a schematic view illustrating the arrangement of a plurality of winding groups on a flat band-shaped stator core according to an eleventh embodiment.

Compared to the tenth embodiment (see FIG. 14), in the present embodiment, as shown in FIG. 15, each of the teeth 6 has a pair of protrusions 16 formed at its distal end; the protrusions 16 protrude in the circumferential direction respectively toward those two of the slots 11 which adjoin the tooth 6.

Further, in the present embodiment, among all the protrusions 16 of the teeth 6, the circumferential width of those protrusions 16 which protrude toward the respective large slots (or two-phase slots) 13 is set to be greater than the circumferential width of the other protrusions 16 which protrude toward the respective small slots (or single-phase slots) 12.

Setting the circumferential width of the protrusions 16 protruding toward the large slots 13 as above, it is possible to more effectively utilize the magnetic fluxes flowing in the specific teeth 14 of the stator core 8.

Twelfth Embodiment

This embodiment illustrates a stator 1 which has a similar configuration to the stator 1 according to the eleventh embodiment; accordingly, only the differences therebetween will be described hereinafter.

Figure 16:
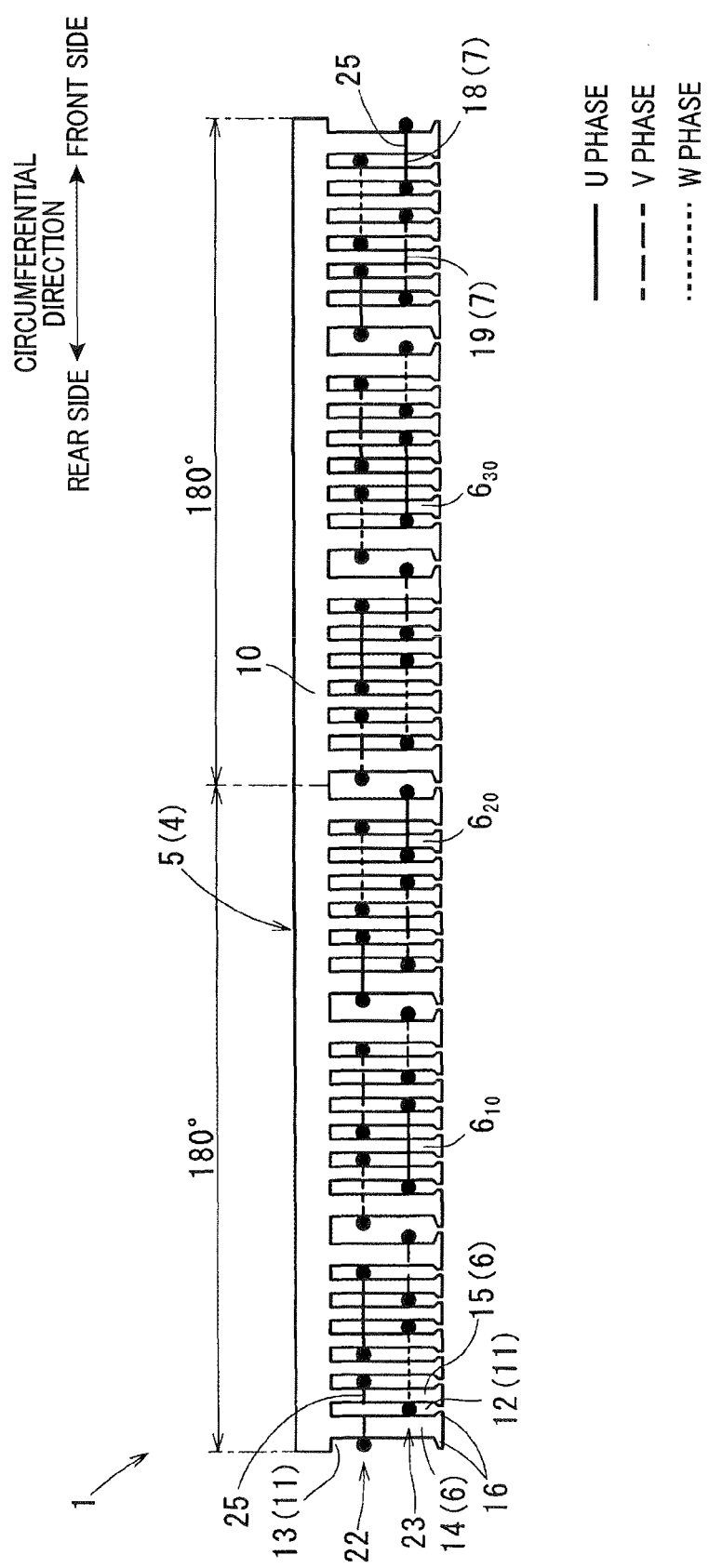
FIG. 16 is a schematic view illustrating the arrangement of a plurality of winding groups on a flat band-shaped stator core according to a twelfth embodiment.

Compared to the eleventh embodiment (see FIG. 15), in the present embodiment, as shown in FIG. 16, all the circumferential distances between circumferentially-facing pairs of the protrusions 16 of the teeth 6 are set to be equal to each other.

Setting the circumferential distances as above, it is possible to smooth the circumferential distribution of magnetic flux density in the annular gap between the stator 1 and the rotor 2, thereby suppressing, for example, torque ripple of the rotating electric machine 3.

Thirteenth Embodiment

Figure 17:
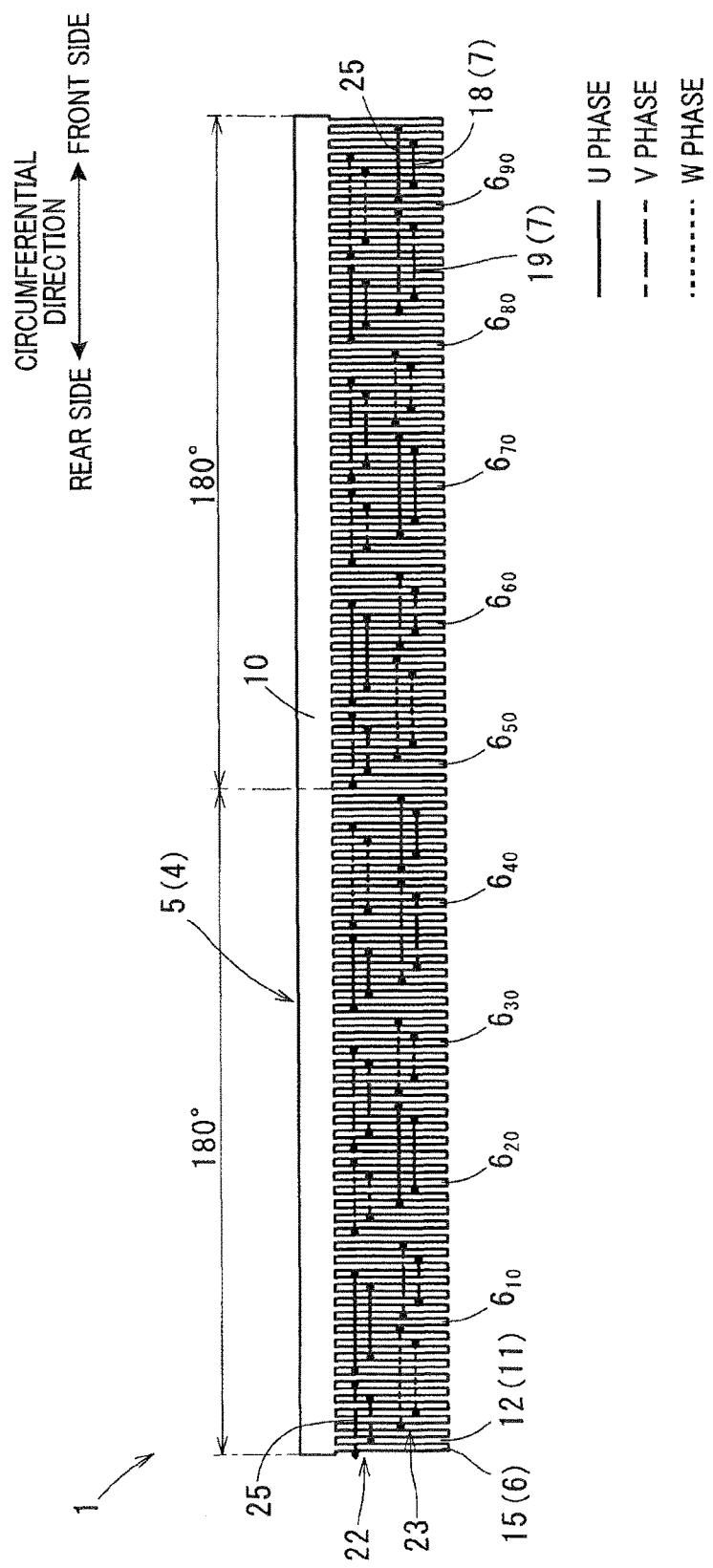
FIG. 17 is a schematic view illustrating the arrangement of a plurality of winding groups on a flat band-shaped stator core according to a thirteenth embodiment.

FIG. 17 shows the configuration of a stator 1 according to a thirteenth embodiment.

In the present embodiment, all the winding groups 7 are distributedly wound on the teeth 6. The number q of the slots 11 per pole per phase is equal to 2.

Further, in the present embodiment, each of the slots 11 is configured as a small slot (or single-phase slot) 12. That is, all the slots 11 are small slots 12; there is no large slot (or two-phase slot) 13 formed in the stator core 4.

Accordingly, in the present embodiment, each of the teeth 6 is configured as a normal tooth 15. That is, all the teeth 6 are normal teeth 15; there is no specific tooth 14 formed in the stator core 4. In addition, none of the teeth 6 has any protrusions 16 formed at its distal end.

In the present embodiment, the number N of poles is equal to 16. The total number S of the slots 11 (or of the teeth 6) of the stator core 4 is equal to 96. The total number of the winding groups 7 is equal to 24.

Further, in the present embodiment, the winding groups 7 consist of twelve short-pitch winding groups 18 and twelve full-pitch winding groups 19, which are equally assigned to the three different phases. That is, to each of U, V and W phases, there are assigned four short-pitch winding groups 18 and four full-pitch winding groups 19.

Accordingly, Equations 4 and 5 described in the fourth embodiment are also satisfied in the stator 1 according to the present embodiment.

Further, in the present embodiment, six of the twelve short-pitch winding groups 18 are outward-located winding groups 22, while the remaining six short-pitch winding groups 18 are inward-located winding groups 23. Similarly, six of the twelve full-pitch winding groups 19 are outward-located winding groups 22, while the remaining six full-pitch winding groups 19 are inward-located winding groups 23.

Furthermore, in the present embodiment, all the outward-located winding groups 22 are arranged so that the six short-pitch winding groups 18 are alternately positioned in the circumferential direction with the six full-pitch winding groups 19. Similarly, all the inward-located winding groups 23 are arranged so that the six short-pitch winding groups 18 are alternately positioned in the circumferential direction with the six full-pitch winding groups 19.

More specifically, as shown in FIG. 17, for the outward-located winding groups 22, the first V-phase short-pitch winding group 18 is wound so as to span the teeth $6_1$-$6_5$. The first U-phase full-pitch winding group 19 is wound so as to span the teeth $6_7$-$6_{13}$. The first W-phase short-pitch winding group 18 is wound so as to span the teeth $6_{17}$-$6_{21}$. The first V-phase full-pitch winding group 19 is wound so as to span the teeth $6_{23}$-$6_{29}$. The first U-phase short-pitch winding group 18 is wound so as to span the teeth $6_{33}$-$6_{37}$. The first W-phase full-pitch winding group 19 is wound so as to span the teeth $6_{39}$-$6_{45}$.

Further, for the outward-located winding groups 22, the second V-phase short-pitch winding group 18 is wound so as to span the teeth $6_{49}$-$6_{53}$. The second U-phase full-pitch winding group 19 is wound so as to span the teeth $6_{55}$-$6_{61}$. The second W-phase short-pitch winding group 18 is wound so as to span the teeth $6_{65}$-$6_{69}$. The second V-phase full-pitch winding group 19 is wound so as to span the teeth $6_{71}$-$6_{77}$. The second U-phase short-pitch winding group 18 is wound so as to span the teeth $6_{81}$-$6_{85}$. The second W-phase full-pitch winding group 19 is wound so as to span the teeth $6_{87}$-$6_{93}$.

On the other hand, for the inward-located winding groups 23, the third W-phase full-pitch winding group 19 is wound so as to span the teeth $6_3$-$6_9$. The third V-phase short-pitch winding group 18 is wound so as to span the teeth $6_{11}$-$6_{15}$. The third U-phase full-pitch winding group 19 is wound so as to span the teeth $6_{19}$-$6_{25}$. The third W-phase short-pitch winding group 18 is wound so as to span the teeth $6_{27}$-$6_{31}$. The third V-phase full-pitch winding group 19 is wound so as to span the teeth $6_{35}$-$6_{41}$. The third U-phase short-pitch winding group 18 is wound so as to span the teeth $6_{43}$-$6_{47}$.

Further, for the inward-located winding groups 23, the fourth W-phase full-pitch winding group 19 is wound so as to span the teeth $6_{51}$-$6_{57}$. The fourth V-phase short-pitch winding group 18 is wound so as to span the teeth $6_{59}$-$6_{63}$. The fourth U-phase full-pitch winding group 19 is wound so as to span the teeth $6_{67}$-$6_{73}$. The fourth W-phase short-pitch winding group 18 is wound so as to span the teeth $6_{75}$-$6_{79}$. The fourth V-phase full-pitch winding group 19 is wound so as to span the teeth $6_{83}$-$6_{89}$. The fourth U-phase short-pitch winding group 18 is wound so as to span the teeth $6_{91}$-$6_{95}$.

Consequently, in the present embodiment, all the twelve outward-located winding groups 22 are circumferentially spaced so as not to radially overlap each other. Similarly, all the twelve inward-located winding groups 23 are also circumferentially spaced so as not to radially overlap each other. Further, the phases (i.e., U, V and W) of all the winding groups 7 are arranged in a pattern which is repeated for every 180° in mechanical angle. In other words, the same pattern of arranging the phases of the winding groups 7 is repeated twice in the circumferential direction of the stator core 4.

Furthermore, in the present embodiment, all the twelve short-pitch winding groups 18 are arranged in pairs to form six short-pitch winding group pairs 25. For each of the short-pitch winding group pairs 25, the two short-pitch winding groups 18 of the pair are circumferentially adjacent to each other with one of the teeth 6 interposed therebetween.

More specifically, the first short-pitch winding group pair 25 consists of the first V-phase short-pitch winding group 18 and the fourth U-phase short-pitch winding group 18 which are circumferentially adjacent to each other with the tooth $6_{96}$ interposed between. The second short-pitch winding group pair 25 consists of the first W-phase short-pitch winding group 18 and the third V-phase short-pitch winding group 18 which are circumferentially adjacent to each other with the tooth $6_{16}$ interposed between. The third short-pitch winding group pair 25 consists of the first U-phase short-pitch winding group 18 and the third W-phase short-pitch winding group 18 which are circumferentially adjacent to each other with the tooth $6_{32}$ interposed between. The fourth short-pitch winding group pair 25 consists of the second V-phase short-pitch winding group 18 and the third U-phase short-pitch winding group 18 which are circumferentially adjacent to each other with the tooth $6_{48}$ interposed between. The fifth short-pitch winding group pair 25 consists of the second W-phase short-pitch winding group 18 and the fourth V-phase short-pitch winding group 18 which are circumferentially adjacent to each other with the tooth $6_{64}$ interposed between. The sixth short-pitch winding group pair 25 consists of the second U-phase short-pitch winding group 18 and the fourth W-phase short-pitch winding group 18 which are circumferentially adjacent to each other with the tooth $6_{80}$ interposed between.

According to the present embodiment, it is possible to achieve the following advantageous effects.

In the present embodiment, the winding groups 7 include the six short-pitch winding group pairs 25. Therefore, it is possible to arrange the two short-pitch winding groups 18 of one of the six short-pitch winding group pairs 25 (e.g., the first V-phase short-pitch winding group 18 and the fourth U-phase short-pitch winding group 18 of the first short-pitch winding group pair 25) respectively at the front and rear ends of the flat band-shaped stator core 5 without dividing any of the winding groups 7 into two segments. Consequently, it becomes possible to eliminate the step of joining the two segments 104 to restore the divided winding group 103 in the conventional method described previously (see FIG. 19). As a result, the manufacturing process of the stator 1 can be simplified, thereby improving the productivity of the stator 1.

Moreover, in the present embodiment, the number of the short-pitch winding groups 18 per phase and the number of the full-pitch winding groups 19 per phase are set so as to respectively satisfy Equations 4 and 5. Further, all the twelve short-pitch winding groups 18 are arranged in pairs to form the six short-pitch winding group pairs 25. Furthermore, the same pattern of arranging the phases of the winding groups 7 is repeated for every 180° in mechanical angle.

With the above arrangement, it is possible to keep all the voltages or torques respectively induced in U, V and W phases equal to each other, thereby maintaining balance between the three phases.

In addition, in the present embodiment, all the outward-located winding groups 22 are spaced in the circumferential direction of the stator core 4 (or 8) so as not to intersect and radially overlap each other. All the inward-located winding groups 23 are also spaced in the circumferential direction of the stator core 4 so as not to intersect and radially overlap each other.

With the above configuration, it is possible to suitably arrange the end portions 21 of the windings of the winding groups 7 on both the axial sides of the stator core 4 without causing interference between the end portions 21. Consequently, it is possible to minimize the protruding height of the end portions 21 of the windings of the winding groups 7 from the axial end faces of the stator core 4 while securing high space factors of the windings in the slots 11 of the stator core 4.

Fourteenth Embodiment

This embodiment illustrates a stator 1 which has a similar configuration to the stator 1 according to the thirteenth embodiment; accordingly, only the differences therebetween will be described hereinafter.

Figure 18:
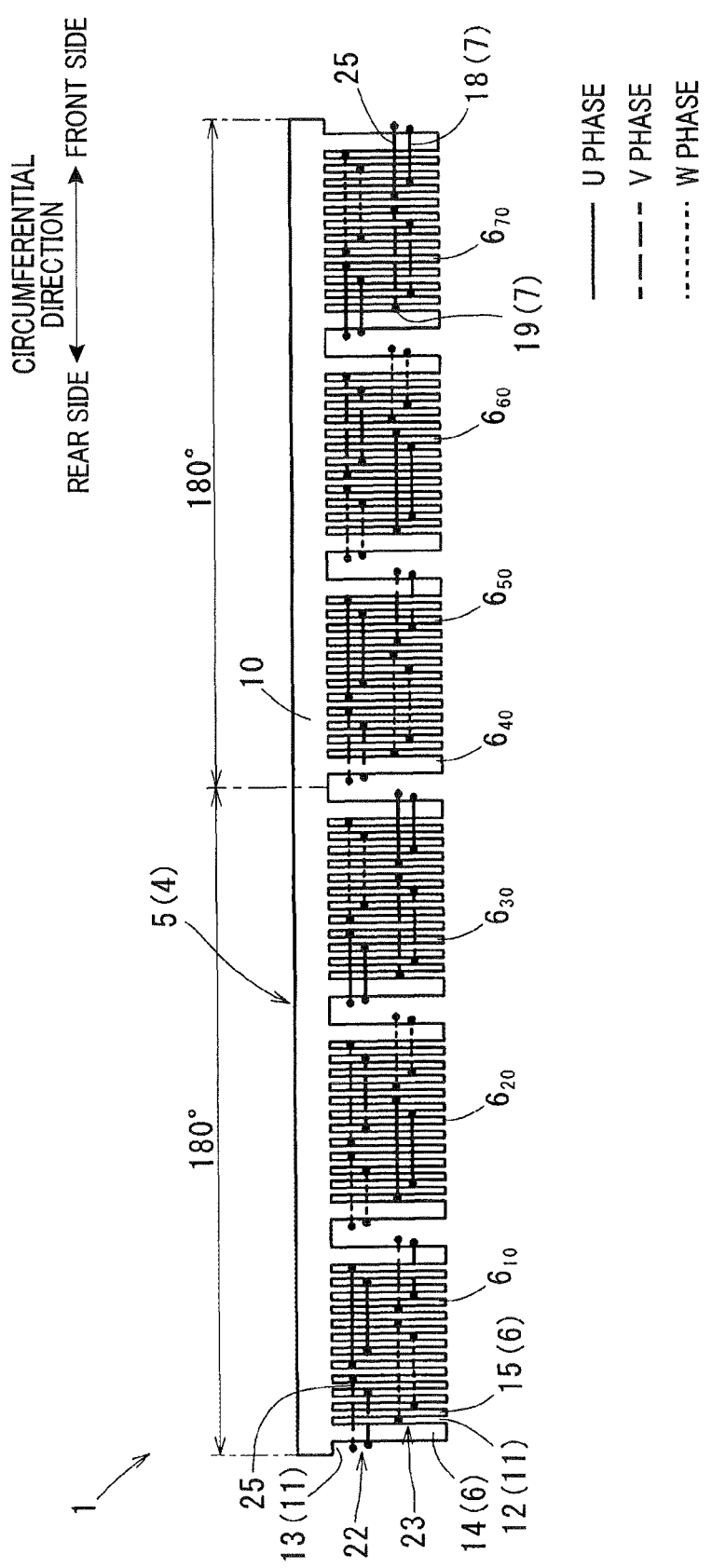
FIG. 18 is a schematic view illustrating the arrangement of a plurality of winding groups on a flat band-shaped stator core according to a fourteenth embodiment.

As shown in FIG. 18, the flat band-shaped stator core 5 in the present embodiment is obtained by removing the six teeth $6_{16}$, $6_{32}$, $6_{48}$, $6_{64}$, $6_{80}$ and $6_{96}$ and those teeth 6 which are immediately circumferentially adjacent to the six teeth from the flat band-shaped stator core 5 in the thirteenth embodiment (see FIG. 17). That is, the teeth $6_1$, $6_{15}$-$6_{17}$, $6_{31}$-$6_{33}$, $6_{47}$-$6_{49}$, $6_{63}$-$6_{65}$, $6_{79}$-$6_{81}$ and $6_{95}$-$6_{96}$ are removed from the flat band-shaped stator core 5. In addition, as described previously, in the thirteenth embodiment, each of the six teeth $6_{16}$, $6_{32}$, $6_{48}$, $6_{64}$, $6_{80}$ and $6_{96}$ is interposed between the two short-pitch winding groups 18 of one of the six short-pitch winding group pairs 25.

Consequently, in the present embodiment, the total number S of the slots 11 (or the total number of the teeth 6) is reduced to 78. Further, by removing the eighteen teeth 6, there are formed six large slots 13 in the flat band-shaped stator core 5 (also in the annular stator core 8). Accordingly, the teeth $6_1$, $6_{13}$, $6_{14}$, $6_{26}$, $6_{27}$, $6_{39}$, $6_{40}$, $6_{52}$, $6_{53}$, $6_{65}$, $6_{66}$ and $6_{78}$ become specific teeth 14.

Furthermore, in the present embodiment, each of the sixth large slots 13 makes up one two-phase slot to have both the short-pitch winding groups 18 of one of the six short-pitch winding group pairs 25 arranged therein. Moreover, the circumferential width of the large slots 13 is set to be substantially four times the circumferential with of the other slots 11 (i.e., the small slots 12).

Accordingly, in the present embodiment, the total number S of the slots 11 satisfies Equation 6. The circumferential width of the large slots (or two-phase slots) 13 is substantially 2×q times the circumferential width of the other slots 11. Here, q is equal to 2 as described in the thirteenth embodiment.

With the above configuration, it is possible to arrange both the short-pitch winding groups 18 of each short-pitch winding group pair 25 in one of the large slots 13 so as not to radially overlap each other while surrounding each of all the teeth 6 of the stator core 4 (or 8) with the winding groups 7. Consequently, it becomes possible to effectively utilize all the magnetic fluxes flowing in the teeth 6 of the stator core 8, thereby increasing the efficiency of the rotating electric machine 3.

Moreover, in the present embodiment, the circumferential width of the specific teeth 14 is increased to be substantially 2.5 times the circumferential width of the other teeth 6 (i.e., the normal teeth 15).

That is, in the present embodiment, the circumferential width of the specific teeth 14 is set to be substantially (q+0.5) times the circumferential width of the other teeth 6.

Setting the circumferential width of the specific teeth 14 as above, it is possible to relax magnetic saturation of the specific teeth 14, thereby increasing the winding factor of the rotating electric machine 3.

While the above particular embodiments have been shown and described, it will be understood by those skilled in the art that various modifications, changes, and improvements may be made without departing from the spirit of the present invention.

For example, in the previous embodiments, the present invention is directed to the stator 1 for the inner rotor-type rotating electric machine 3 in which the rotor 2 is disposed radially inside the stator 1. However, the invention can also be applied to a stator for an outer rotor-type rotating electric machine in which a rotor is disposed radially outside the stator.

Moreover, it is possible for the parameters, such as the number N of poles, the total number S of the slots 11 and the number q of the slots 11 per pole per phase, to take any suitable values other than those described in the previous embodiments. In addition, it is also possible to set the ratio of circumferential width between the large slots 13 and the small slots 12 and the ratio of circumferential width between the specific teeth 14 and the normal teeth 15 to any suitable values other than those described in the previous embodiment.

What is claimed is:

1. A stator for a rotating electric machine comprising a rotor having a plurality of magnetic poles formed on a periphery thereof radially facing the stator, and the polarities of the magnetic poles alternate between north and south in the circumferential direction of the rotor, a rotor pole pitch being defined by adjacent north and south poles in the circumferential direction, the stator comprising:

an annular stator core having a plurality of teeth and a plurality of slots formed therein, the teeth being spaced from one another in a circumferential direction of the stator core, each of the slots being formed between one circumferentially-adjacent pair of the teeth; and a plurality of winding groups mounted on the teeth of the stator core, each of the winding groups belonging to one of a plurality of phases, wherein each of the winding groups is either a short-pitch winding group or a full-pitch winding group which consists of windings wound at a pitch equal to 180° in electrical angle and the same as the rotor pole pitch,
the winding groups include at least one short-pitch winding group pair which consists of two short-pitch winding groups that respectively belong to two different phases and are circumferentially adjacent to each other,
the two short-pitch winding groups are arranged so as not to overlap each other in a radial direction of the stator core,
there are no other winding groups interposed between the two short-pitch winding groups in the circumferential direction of the stator core,
the stator core is formed by bending a flat band-shaped stator core into the annular shape, and
the winding groups include at least one circumferentially-adjacent pair of winding groups that respectively belong to two different phases and overlap each other in a radial direction of the stator core.

2. The stator as set forth in claim 1, wherein $M1=2$; and $M2=N/2-2$, where M1 is the number of the short-pitch winding groups per phase, M2 is the number of the full-pitch winding groups per phase, and N is an even number not less than 4 and represents the number of poles of the rotating electric machine, and
wherein
all the short-pitch winding groups are arranged in pairs to form a plurality of short-pitch winding group pairs,
each of the short-pitch winding group pairs consists of two short-pitch winding groups that respectively belong to two different phases and are circumferentially adjacent to each other, and
for each of the short-pitch winding group pairs, the two short-pitch winding groups are arranged so as not to overlap each other in a radial direction of the stator core, and there are no other winding groups interposed between the two short-pitch winding groups in the circumferential direction of the stator core.

3. The stator as set forth in claim 2, wherein
the slots formed in the stator core include a plurality of two-phase slots in each of which are arranged both the short-pitch winding groups of one of the short-pitch winding group pairs,
$S=3 \times q \times N-3 \times (2 \times q-1)$, where q is the number of the slots per pole per phase and S represents both the total number of the slots and the total number of the teeth formed in the stator core, and
a circumferential width of the two-phase slots is substantially $2 \times q$ times a circumferential width of the other slots.

4. The stator as set forth in claim 3, wherein among all the teeth formed in the stator core, a circumferential width of those teeth which form the two-phase slots is substantially $(q+0.5)$ times a circumferential width of the other teeth.

5. The stator as set forth in claim 3, wherein
each of the teeth of the stator core has a pair of protrusions that are formed at a distal end of the tooth so as to protrude in the circumferential direction of the stator core respectively toward those two of the slots of the stator core which adjoin the tooth, and
among all the protrusions of the teeth, those protrusions which protrude toward the respective two-phase slots have a greater circumferential width than the other protrusions.

6. The stator as set forth in claim 1, wherein $M1=4$; and $M2=N/2-4$, where M1 is the number of the short-pitch winding groups per phase, M2 is the number of the full-pitch winding groups per phase, and N is an even number not less than 8 and represents the number of poles of the rotating electric machine, and
wherein
all the short-pitch winding groups are arranged in pairs to form a plurality of short-pitch winding group pairs,
each of the short-pitch winding group pairs consists of two short-pitch winding groups that respectively belong to two different phases and are circumferentially adjacent to each other,
for each of the short-pitch winding group pairs, the two short-pitch winding groups are arranged so as not to overlap each other in a radial direction of the stator core, and there are no other winding groups interposed between the two short-pitch winding groups in the circumferential direction of the stator core, and
the phases of all the winding groups are arranged in a pattern which is repeated for every 180° in mechanical angle.

7. The stator as set forth in claim 6, wherein
the slots formed in the stator core include a plurality of two-phase slots in each of which are arranged both the short-pitch winding groups of one of the short-pitch winding group pairs,
$S=3 \times q \times N-6 \times (2 \times q-1)$, where q is the number of the slots per pole per phase and S represents both the total number of the slots and the total number of the teeth formed in the stator core, and
a circumferential width of the two-phase slots is substantially $2 \times q$ times a circumferential width of the other slots.

8. The stator as set forth in claim 7, wherein among all the teeth formed in the stator core, a circumferential width of those teeth which form the two-phase slots is substantially $(q+0.5)$ times a circumferential width of the other teeth.

9. The stator as set forth in claim 7, wherein
each of the teeth of the stator core has a pair of protrusions that are formed at a distal end of the tooth so as to protrude in the circumferential direction of the stator core respectively toward those two of the slots of the stator core which adjoin the tooth, and
among all the protrusions of the teeth, those protrusions which protrude toward the respective two-phase slots have a greater circumferential width than the other protrusions.

10. The stator as set forth in claim 1, wherein all of the winding groups are classified into one of (a) outward-located winding groups and (b) inward-located winding groups,
for each of the outward-located winding groups, end portions of the windings of the group, which protrude outside of the slots of the stator core, are located radially outward of a radial center position of the slots,
for each of the inward-located winding groups, end portions of the windings of the group, which protrude outside of the slots of the stator core, are located radially inward of the radial center position of the slots, all the outward-located winding groups are spaced in the circumferential direction of the stator core so as not to intersect and radially overlap each other, and all the inward-located winding groups are spaced in the circumferential direction of the stator core so as not to intersect and radially overlap each other.

11. The stator as set forth in claim 1, wherein each of the teeth of the stator core has a pair of protrusions that are formed at a distal end of the tooth so as to protrude in the circumferential direction of the stator core respectively toward those two of the slots of the stator core which adjoin the tooth, and all the circumferential distances between circumferentially-facing pairs of the protrusions of the teeth are set to be equal to each other.

12. The stator as set forth in claim 1, wherein the winding groups include only one short-pitch winding group pair, the slots formed in the stator core include a two-phase slot in which are arranged both the short-pitch winding groups forming the short-pitch winding group pair, and a circumferential width of the two-phase slot is substantially 2×q times a circumferential width of the other slots, where q is the number of the slots per pole per phase.

13. The stator as set forth in claim 12, wherein among all the teeth formed in the stator core, a circumferential width of those two teeth which form the two-phase slot therebetween is substantially (q+0.5) times a circumferential width of the other teeth.

14. The stator as set forth in claim 12, wherein each of the teeth of the stator core has a pair of protrusions that are formed at a distal end of the tooth so as to protrude in the circumferential direction of the stator core respectively toward those two of the slots of the stator core which adjoin the tooth, and among all the protrusions of the teeth, those two protrusions which protrude toward the two-phase slot have a greater circumferential width than the other protrusions.

* * * * *